(12) United States Patent
Uehara et al.

(10) Patent No.: US 7,470,052 B2
(45) Date of Patent: Dec. 30, 2008

(54) LIGHT SOURCE DEVICE, DISPLAY DEVICE USING SAME, AND TERMINAL DEVICE

(75) Inventors: Shinichi Uehara, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 55 days.

(21) Appl. No.: 11/389,263

(22) Filed: Mar. 27, 2006

(65) Prior Publication Data

US 2006/0215418 A1 Sep. 28, 2006

(30) Foreign Application Priority Data

Mar. 28, 2005 (JP) ............................. 2005-091630

(51) Int. Cl.
*F21V 7/04* (2006.01)
(52) U.S. Cl. ...................... 362/606; 362/607; 362/620; 362/626
(58) Field of Classification Search ................ 362/606, 362/619, 620, 626, 625, 339, 338, 326; 359/599
See application file for complete search history.

(56) References Cited

U.S. PATENT DOCUMENTS

| | | | | |
|---|---|---|---|---|
| 5,839,812 A | * | 11/1998 | Ge et al. ...................... | 362/607 |
| 5,887,964 A | * | 3/1999 | Higuchi et al. .............. | 362/620 |
| 6,075,649 A | * | 6/2000 | Naito .......................... | 359/619 |
| 6,199,989 B1 | * | 3/2001 | Maeda et al. ................ | 359/613 |
| 7,210,836 B2 | * | 5/2007 | Sasagawa et al. ........... | 362/606 |
| 2001/0046134 A1 | * | 11/2001 | Masaki et al. ................ | 362/339 |
| 2003/0117793 A1 | * | 6/2003 | Shin et al. ...................... | 362/31 |
| 2003/0174518 A1 | * | 9/2003 | Toshima et al. .............. | 362/558 |
| 2004/0125592 A1 | * | 7/2004 | Nagakubo et al. ............. | 362/31 |
| 2004/0130882 A1 | * | 7/2004 | Hara et al. ..................... | 362/31 |
| 2005/0185416 A1 | * | 8/2005 | Lee et al. ..................... | 362/551 |

FOREIGN PATENT DOCUMENTS

JP 9-265092 A 10/1997

OTHER PUBLICATIONS

Hiroshi Okada, "Monthly Display," Apr. 2004, pp. 14-21.

* cited by examiner

*Primary Examiner*—Ali Alavi
*Assistant Examiner*—Evan Dzierzynski
(74) *Attorney, Agent, or Firm*—Sughrue Mion, PLLC

(57) ABSTRACT

The light source device of a display device according to the present invention has an optical waveguide, a cone sheet, and a light source disposed along the side surface of the optical waveguide. The light-emitting surface of the optical waveguide is flat, and a tilted surface that is tilted towards the light source with respect to the light-emitting surface is formed on the light-diffusing surface. The cone sheet has a flat plate and a plurality of circular cones arranged two-dimensionally on the light-incident surface of the flat plate. The central axes of the circular cones are parallel to each other. The invention provides a light source device that can be made thin and is capable of increasing the directivity of emitted light in two dimensions.

19 Claims, 17 Drawing Sheets

10 DEGREES

20 DEGREES

30 DEGREES

40 DEGREES

50 DEGREES

60 DEGREES

70 DEGREES

EMISSION ANGLE (DEGREES)
VERTICAL DIRECTION

EMISSION ANGLE (DEGREES)
HORIZONTAL DIRECTION

LIGHT SOURCE DEVICE, DISPLAY DEVICE USING SAME, AND TERMINAL DEVICE

BACKGROUND OF THE INVENTION

1. Field of the Invention

The present invention relates to a light source device having increased directivity of emitted light, to a display device that uses this light source device, and to a terminal device.

2. Description of the Related Art

Because of their thin profile, light weight, small size, low energy consumption, and other advantages, display devices that use liquid crystals have been widely deployed and used in a range of devices that includes monitors, televisions (TV: Television), and other large terminal devices; notebook-type personal computers, cash dispensers, vending machines, and other mid-sized terminal devices; and personal TVs, PDAs (Personal Digital Assistance: personal information terminal), mobile telephones, mobile gaming devices, and other small terminal devices. These liquid crystal display devices can be generally classified as transmissive, reflective, or transflective (using transmitted light and reflected light jointly) according to the type of light source used. Energy consumption can be reduced in the reflective type, since it can utilize external light in the display, but contrast and other aspects of display performance are inferior compared to the transmissive type. Therefore, transmissive and transflective liquid crystal display devices are currently in the mainstream. In transmissive and transflective liquid crystal display devices, a light source device is installed on the back surface of a liquid crystal panel, and a display is created using the light emitted by the light source device.

Since a display device mounted in a large terminal device is most often viewed by numerous users at once, the light source device used in the display device is preferably capable of producing a uniform luminance distribution in a wide range. In contrast, a display device mounted in a medium- or small-sized terminal device is often viewed by a single user, or a small number of users at once, so the light source device used therein may radiate light in the frontal direction only. Attempts have therefore been made to increase directivity in the frontal direction and reduce power consumption in a light source device that is mounted in a medium- or small-sized terminal device, and some of these light source devices are in practical use.

FIG. 28 is a schematic perspective view showing the first conventional light source device cited on pages 14 through 21 of the April 2004 issue of *Monthly Display*. As shown in FIG. 28, the first conventional light source device is composed of a light source 1101, an optical waveguide 1102 for propagating and emitting in planar fashion the light emitted by the light source 1101, a diffusing sheet 1103 disposed on the side of the light-exiting surface of the optical waveguide 1102, two prism sheets 1104 and 1105 disposed on the diffusing sheet 1103, a diffusing sheet 1106 disposed on the prism sheets, and a reflecting sheet 1107 disposed on the opposite side from the light-exiting surface of the optical waveguide 1102. A dot shape is printed on the surface of the optical waveguide 1102. A prism shape in a one-dimensional arrangement extending in one direction is formed in the two prism sheets 1104 and 1105. The apex angle of this prism shape is 90 degrees. The prism sheets 1104 and 1105 are also arranged so that the extension direction of the prism shape formed in the prism sheet 1104 and the extension direction of the prism shape formed in the prism sheet 1105 are orthogonal to each other. Furthermore, the prism sheets 1104 and 1105 are arranged so that the prism surfaces face upwards (the side opposite the optical waveguide).

In the first conventional light source device that has this type of configuration, the light emitted from the light source 1101 enters the optical waveguide 1102 from the side surface thereof, and is propagated in the optical waveguide 1102. A portion of the light is then scattered by the printed dot pattern and emitted from the emitting surface of the optical waveguide 1102. The uniformity ratio of illuminance of the light emitted from the optical waveguide 1102 is enhanced by the diffusing sheet 1103 disposed between the optical waveguide 1102 and the prism sheet 1104, and the light enters the prism sheets 1104 and 1105. Since the apex angle of the prism sheets 1104 and 1105 is 90 degrees, light rays directed near a 30-degree angle from the front refract and proceed in the front direction. As a result, the light rays are focused in the front direction, and the frontal luminance is enhanced.

FIG. 29 is a schematic perspective view showing the second conventional light source device cited on pages 14 through 21 of the April 2004 issue of *Monthly Display*. As shown in FIG. 29, the second conventional light source device is composed of a light source 2101, an optical waveguide 2102 for propagating and emitting in planar fashion the light emitted by the light source 2101, a prism sheet 2103 disposed on the side of the light-exiting surface of the optical waveguide 2102, and a reflecting sheet 2104 disposed on the opposite side from the light-exiting surface of the optical waveguide 2102. The optical waveguide 2102 is a matt prism optical waveguide in which a matte pattern (not shown in the drawing) is formed on the light-exiting surface thereof, and a row of prisms extending in the direction orthogonal to the extension direction of the light source is formed on the surface facing the reflecting sheet 2104, which is the surface on the opposite side. The prism sheet 2103 is arranged with the prism surface towards the side of the optical waveguide, the extension direction of the prism rows is the direction that is parallel to the extension direction of the linear light source, and the arrangement direction of the prism rows is the direction that is orthogonal to the extension direction of the light source.

In the second conventional light source device that has this type of configuration, the light emitted from the light source 2101 enters the optical waveguide 2102 and is propagated in the optical waveguide 2102. A portion of the light is then excluded from the condition of total reflection by the matt pattern formed in the light-exiting surface, which is the surface on the side of the prism sheet of the optical waveguide 2102, and is emitted from the optical waveguide 2102. The light emitted from the optical waveguide 2102 is in a condition slightly removed from the total reflectance condition of the optical waveguide 2102, and is therefore highly directed light having a peak near 65 degrees from the normal to the emitting surface in the direction orthogonal to the light source. This light enters the prism sheet 2103, but is totally reflected by the tilted surface of the prism on the opposite side and emitted in the frontal direction after being refracted by the tilted surface of the prism on the incident side.

As previously mentioned, since the light that is incident on the prism sheet 2103 has high directivity in the direction orthogonal to the light source, the light emitted from the prism sheet also has high directivity with respect to the direction orthogonal to the light source. On the other hand, directivity in the direction parallel to the light source is ensured by forming a row of prisms extending in the direction orthogonal to the light source in the surface on the side of the reflecting sheet 2104 of the optical waveguide 2102. FIGS. 30A and 30B are graphs showing the results of comparing the directivity characteristics of the second conventional light source device with the directivity characteristics of the first conventional light source device, wherein the horizontal axis represents the exit angle, and the vertical axis represents the light intensity. FIG. 30A shows the directivity in the vertical direction, and FIG. 30B shows the directivity in the horizontal direction. FIGS. 30A and 30B show what is described in FIG. 14 on pages 14 through 21 of the April 2004 issue of *Monthly Display*. As shown in FIGS. 30A and 30B, in the second conventional light source device, the directivity is increased not only in the direction orthogonal to the light source, but also in the parallel direction, and directivity is increased more than by the first conventional light source device.

FIG. 31 is a schematic perspective view showing the third conventional light source device shown in FIG. 21 of Japanese Laid-Open Patent Application 9-265092, and FIG. 32 is a partial enlarged view showing area A in FIG. 31. As shown in FIG. 31, the third conventional light source device is composed of a light source 3101; an optical waveguide 3102 for propagating and emitting in planar fashion the light emitted by the light source 3101; a propagation direction characteristic correcting element 3114 for correcting the light emission direction, disposed on the side of the light-emitting surface of the optical waveguide 3102; a reflecting pattern sheet 3116 for performing limited transmission of the light rays incident on the propagation direction characteristic correcting element 3114, disposed between the optical waveguide 3102 and the propagation direction characteristic correcting element 3114; and a reflector 3103 disposed on the opposite side from the light-emitting surface of the optical waveguide 3102. The optical waveguide 3102 is an optical waveguide having scattering properties in which a silicone-based resin material as a substance having a different refractive index is uniformly mixed and dispersed in a matrix composed of polymethyl methacrylate (PMMA), and is formed in a wedge shape whose thickness continuously decreases in the direction away from the light source. The light source 3101 is also disposed on the side where the optical waveguide 3102 is thickest.

As shown in FIG. 32, the propagation direction characteristic correcting element 3114 is provided with a plurality of conical protrusions 3114c, and the conical protrusions 3114c are convex elements that form a two-dimensional array. Flat areas 3114g are formed on the distal ends of the conical protrusions 3114c. The flat areas 3114g are parallel to the light-emitting surface of the optical waveguide 3102. The reflecting pattern sheet 3116 is formed from PMMA or another transparent resin material, for example, and a reflecting film 3116a that is composed of an Ag film or Al film and has mirror reflecting properties is provided to the surface on the side of the propagation direction characteristic correcting element 3114. Circular or elliptical openings are formed in the reflecting film 3116a, and these openings serve as windows 3116w. The portion not occupied by the windows 3116w in the reflecting film 3116a, specifically, the portion in which the Ag film or Al film is formed, is the reflecting portion 3116r. The arrangement period of the windows 3116w in the reflecting pattern sheet 3116 is the same as that of the convex elements 3114c of the propagation direction characteristic correcting element 3114. The two-dimensional positioning of the dimensions of the reflecting portion 3116r and the convex elements (conical protrusions) 3114c relative to each other is designed so as not to obstruct entrance of light into the flat areas 3114g, and so as to inhibit entrance of light into the valleys between the flat areas 3114g.

In the third conventional light source device thus configured, the light emitted from the light source 3101 is incident on and propagated in the optical waveguide 3102, and a narrowly directed luminous flux from the light-emitting surface of the optical waveguide 3102 is emitted at an angle of about 60 to 80 degrees from the normal of the light-emitting surface. The direction in which this luminous flux is propagated has a certain spread both in the cross-section in the direction orthogonal to the lamp and in the cross-section in the direction parallel to the lamp. The luminous flux emitted from the optical waveguide 3102 enters the reflecting portion 3116r or the windows 3116w after being transmitted through the reflecting pattern sheet 3116. The luminous flux incident on the reflecting portion 3116r is reflected towards the inside of the reflecting pattern sheet 3116. Reflection by the inside surface of the reflecting pattern sheet 3116, reflection by the light-emitting surface of the optical waveguide 3102, re-entry into the optical waveguide 3102, re-exiting from the light-emitting surface, and the like provide opportunities for this reflected light and the small amount of reflected light from the windows 3116w to re-enter the windows 3116w. The reflected light is thereby recycled and reused.

Most of the light that is directly incident on the windows 3116w or that enters the windows 3116w through the recycling process described above passes through the windows 3116w and enters the flat areas 3114g of the conical protrusions 3114c at an angle. The parallelism of the propagation direction of the luminous flux is improved when the luminous flux enters the flat areas 3114g at an angle. Incidence on the valleys (null areas) between the flat areas 3114g is suppressed by the reflecting pattern sheet 3116. The luminous flux that is incident at an angle on the flat areas 3114g of the propagation direction characteristic correcting element 3114 is reflected by any portion of the peripheral surfaces 3114s of the conical protrusions 3114c, and is focused in the nearly frontal direction. This reflection causes no reduction in the parallelism of the luminous flux. The luminous flux that is focused in the nearly frontal direction is emitted in substantially orthogonal fashion from the light-emitting surface of the propagation direction characteristic correcting element 3114. It is thereby possible to obtain a light source device that is capable of endowing the emitted light with directivity in two dimensions.

However, the conventional techniques described above have such problems as the following. In the first conventional light source device, the luminous flux emitted from the optical waveguide 1102 and endowed with more uniform luminance by the diffusion sheet 1103 is refracted by two orthogonally arranged prism sheets 1104 and 1105. As a result, the directivity in the frontal direction is increased, and the two prism sheets refract light rays directed near 30 degrees from the normal to the frontal direction, but light rays at other angles are refracted or totally reflected in directions other than the frontal direction. The increase in directivity characteristics is therefore limited. A plurality of prism sheets is also needed in order to increase the directivity in two dimensions, leading to increased thickness of the light source device. This increase in thickness is a particularly significant problem when the light source device is installed in a mobile terminal device.

Unlike the first conventional light source device, the light source device can be made thinner since the second conventional light source device uses a single prism sheet. Higher directivity can be achieved than in the first conventional light source device in the direction perpendicular to the light source, since the luminous flux having high directivity emitted from the optical waveguide is emitted in the frontal direction using the total reflection of the prism sheet. Directivity is increased in the direction parallel to the light source by a row of prisms that is provided to the side of the reflecting sheet of the optical waveguide and is directed perpendicular to the light source, but directivity in the direction perpendicular to the light source is low, and the increase in the two-dimensional directivity is limited.

Furthermore, in the third conventional light source device, two-dimensional directivity is achieved by the reflecting pattern sheet 3116 that has a plurality of circular openings and by the propagation direction characteristic correcting element 3114 that has a plurality of conical protrusions. High directivity can be obtained in the aforementioned second conventional light source device because the principle of total reflectance designed to enhance directivity in the direction orthogonal to the light source is used in two dimensions. However, this method has the significant problem of increasing the thickness of the light source device, since a reflecting pattern sheet and an element for correcting the propagation direction characteristics are required.

SUMMARY OF THE INVENTION

An object of the present invention is to provide a light source device that can be made thin and is capable of increasing the directivity of emitted light in two dimensions, to provide a display device that uses [the light source device], and to provide a terminal device.

The light source device according to the present invention has a light source, a light-guiding member for emitting light incident from the light source in a first direction that is different from the incidence direction of the light, and an optical member for emitting light incident from the light-guiding member in a second direction that is different from the first direction; wherein the optical member has a flat plate composed of a transparent material, and a plurality of circular cones composed of a transparent material and formed on the surface that faces the light-guiding member in the flat plate; and the central axes of the circular cones are parallel to each other.

In the present invention, the light-guiding member increases the directivity of light in the plane that includes the incidence direction and the first direction, and the optical member increases the directivity of light in the direction orthogonal to the aforementioned plane. Therefore, the light emitted from the light source can be emitted with two-dimensionally increased directivity. Since a majority of light emitted from the light source can be emitted in a second direction from the optical member, the light is utilized with high efficiency and is endowed with high luminance. Furthermore, the structure is composed of a light-guiding member and an optical member, resulting in a thinner device.

The phase of one row that comprises the apex points of the circular cones may differ from the phase of the other rows. It is preferred that the direction of the imaginary straight line that links the apex points of the circular cones be parallel to the surface of the flat plate and comprise three mutually different directions. The occurrence of moiré can thereby be minimized when a combination with a display panel is used.

The central axes of the circular cones are preferably tilted with respect to the direction perpendicular to the surface of the flat plate so that the second direction is perpendicular to the surface of the flat plate. The center of the luminance distribution of the light emitted from the light source device can thereby be placed in the frontal direction.

Furthermore, a diffusion pattern for diffusing the transmitted light is preferably formed on the surface of the side on which the circular cones are not formed in the flat plate. The uniformity of the emitted light is thereby enhanced. The light source may also comprise a point light source, and a diffusion pattern for diffusing the light may be formed on the surface of the light-guiding member on which light from the point light source is incident. A point light source can thereby be made into a uniform linear light source, and the uniformity of the in-plane distribution of emitted light can be enhanced in the light source device.

Furthermore, the light-guiding member is an optical waveguide on which the light is incident from the side surface thereof, and a tilted surface that is tilted to the side of the light source with respect to the light-emitting surface may be formed on the surface of the optical waveguide that is on the opposite side from the light-emitting surface that faces the optical member.

The light source device according to the present invention may have a reflecting sheet disposed on the side opposite from the side on which the optical member is disposed as viewed from the light-guiding member. The luminance of the emitted light can thereby be further enhanced.

The display device according to the present invention comprises the light source device, and a display panel for associating an image with the light by transmitting the light emitted from the light source device.

According to the present invention, the light emitted from the light source device has high directivity, and therefore allows the directivity of the display device to be increased and power consumption reduced. The thickness of the display device can also be reduced since the light source device can be made thinner.

The pixel arrangement direction of the display panel is also preferably tilted with respect to the arrangement direction of the circular cones. Moiré that occurs between the display panel and the light source device can thereby be reduced.

An essential feature of the terminal device according to the present invention is that the terminal device has the aforementioned display device. This terminal device may also be a mobile telephone, a personal information terminal device, a gaming device, a digital camera, a video camera, a video player, a notebook-type personal computer, a cash dispenser, or a vending machine.

When the terminal device according to the present invention is a mobile telephone, the light source is preferably disposed on the top side or bottom side of the display screen. By this configuration, there is no need to maintain a space for placement of the light source to the left and right of the display screen in this mobile telephone, and a slim chassis and large screen can be obtained at the same time in the mobile telephone.

According to the present invention, it is possible to provide a light source device that can be made thin and has high directivity of emitted light. It is thereby possible to obtain a display device and terminal device that have low power consumption and can be made thin.

BRIEF DESCRIPTION OF THE DRAWINGS

FIG. 5 is a perspective view showing an optical model of a case in which the light source is on;

FIG. 30A shows the directivity in the vertical direction; and FIG. 30B shows the directivity in the horizontal direction;

DESCRIPTION OF THE PREFERRED EMBODIMENTS

Figure 1:
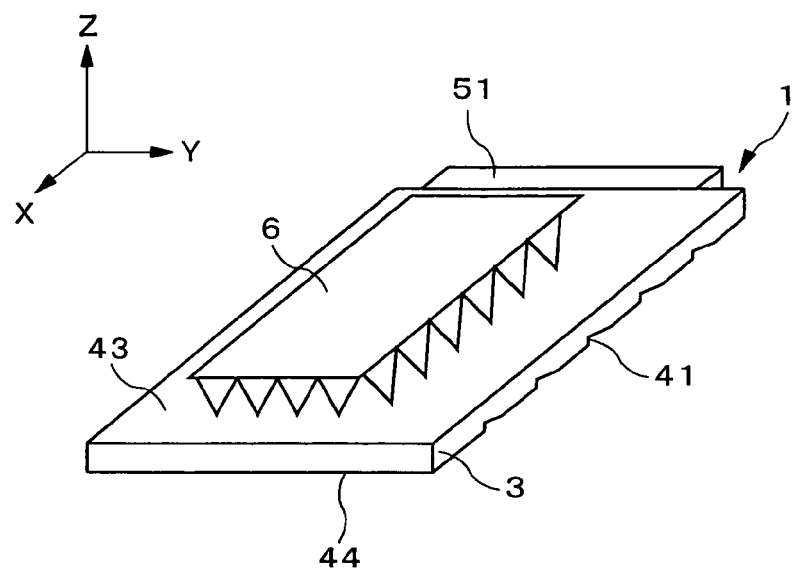
FIG. 1 is a perspective view showing the light source device according to a first embodiment of the present invention.
Figure 2:
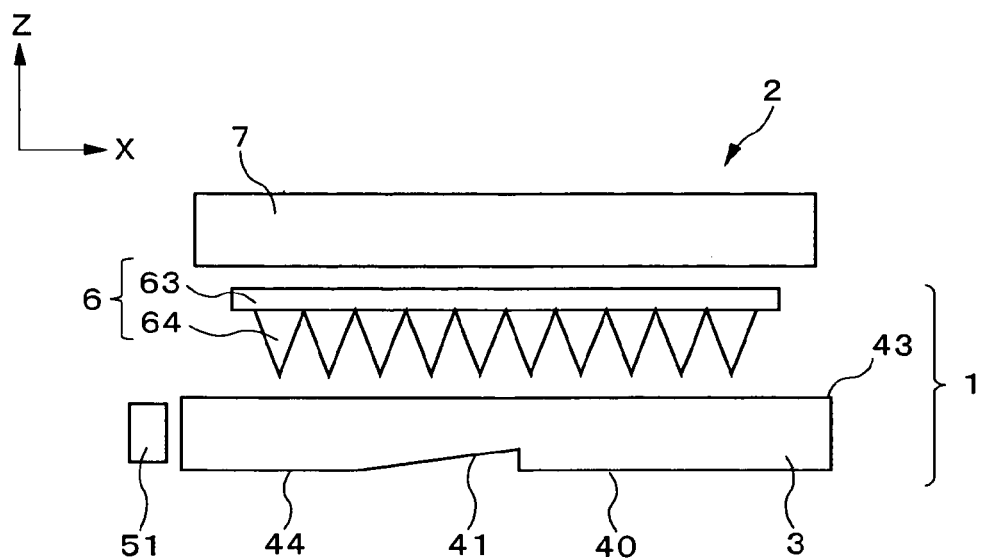
FIG. 2 is a sectional view showing the display device according to the first embodiment of the present invention.
Figure 3:
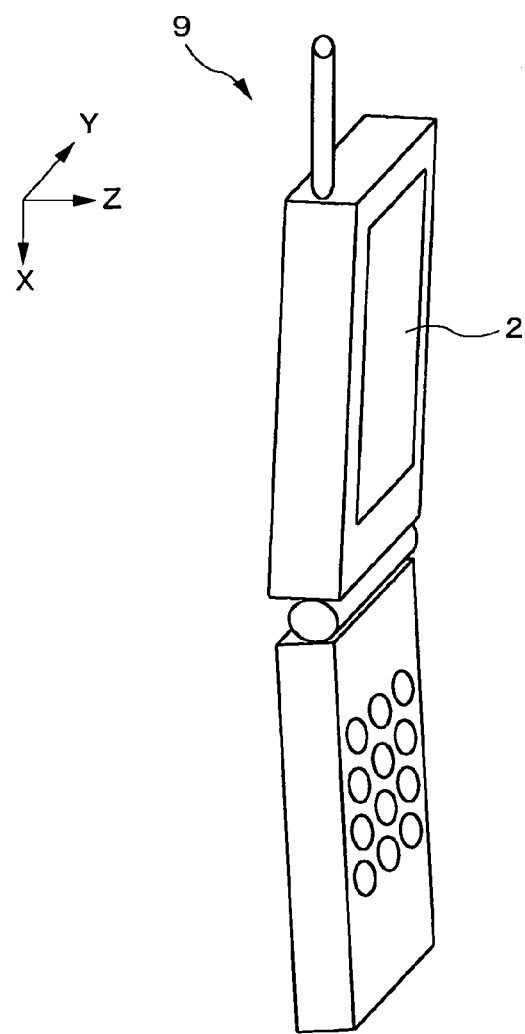
FIG. 3 is a perspective view showing a mobile terminal device according to the first embodiment of the present invention.
Figure 4:
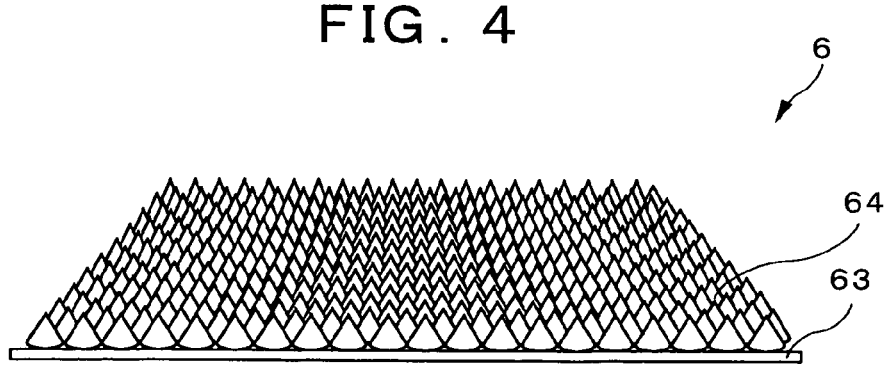
FIG. 4 is a perspective view showing the cone sheet in the first embodiment of the present invention.

The light source device, the display device that uses the light source device, and the terminal device according to embodiments of the present invention will be described in detail hereinafter with reference to the accompanying drawings. The light source device, display device that uses the light source device, and terminal device according to a first embodiment of the present invention will first be described. FIG. 1 is a perspective view showing the light source device according to the present embodiment; FIG. 2 is a sectional view showing the display device that uses the light source device shown in FIG. 1; FIG. 3 is a perspective view showing a mobile terminal device in which the display device shown in FIG. 2 is installed; and FIG. 4 is a perspective view showing the cone sheet used in the light source device of the present embodiment.

As shown in FIG. 1 and FIG. 2, an optical waveguide 3; a cone sheet 6 disposed on the front surface side of the optical waveguide 3, specifically, on the side of the viewer; and a light source 51 disposed on the side surface of the optical waveguide 3 are provided in the light source device 1 of the first embodiment. The front surface of the optical waveguide 3, specifically, the surface on the side of the cone sheet 6, is the light-exiting surface 43. The opposite side, specifically, the back side, is the light-diffusing surface 44. The light-exiting surface 43 is flat. A tilted surface 41 tilted towards the light source 51 with respect to the light-exiting surface 43 is formed in the light-diffusing surface 44. The tilted surface 41 is thereby directly irradiated by light that radiates from the light source 51 and is incident on the optical waveguide 3. The light source 51 is composed of a plurality of LED (Light Emitting Diode) arranged at substantially equal intervals along the side surface, which is the surface of the optical waveguide 3 on which light is incident.

An XYZ orthogonal coordinate system is set up as described below for convenience in the present specification. The direction from the light source 51 to the optical waveguide 3 is the +X direction, and the opposite direction is the −X direction. The +X direction and the −X direction are collectively referred to as the X-axis direction. Within the direction parallel to the light-exiting surface 43 of the optical waveguide 3, the direction orthogonal to the X-axis direction is the Y-axis direction. Furthermore, the direction that is orthogonal to both the X-axis direction and the Y-axis direction is the Z-axis direction; and within the Z-axis direction, the direction from the light-diffusing surface 44 to the light-exiting surface 43 is the +Z direction, and the opposite direction is the −Z direction. The +Z direction is the frontal direction, specifically, the direction towards the viewer. The +Y direction is the direction in which a right-handed coordinate system is established. Specifically, when the person's right thumb is in the +X direction, and the index finger is in the +Y direction, the middle finger is in the +Z direction.

As described above, when the XYZ orthogonal coordinate system is set up, the light-exiting surface 43 of the optical waveguide 3 becomes the XY plane, the light source 51 is disposed in the −X direction as viewed from the optical waveguide 3, and the cone sheet 6 is disposed in the +Z direction. The light source 51 is a diffuse light source, and the light radiated from the light source 51 is diffused at least in the XY direction inside the optical waveguide 3.

As shown in FIGS. 1 and 2, a tilted surface 41 and a flat surface 40 are repeatedly arranged in sequence in the +X direction in the light-diffusing surface 44 of the optical waveguide 3. Only one instance of the tilted surface 41 is shown in FIG. 2 in order to simplify the drawing. The tilted surface 41 is tilted towards the light source 51, specifically, in the direction of irradiation with light that is emitted from the light source 51 and transmitted in the +X direction inside the optical waveguide 3. The absolute value of the tilt angle of the tilted surface 41 is 6 degrees, for example. The boundary of the transition from the tilted surface 41 to the flat surface 40 in the +X direction forms a step in the Z-axis direction. The flat surfaces 40 and tilted surfaces 41 extend throughout the entire length of the optical waveguide 3 along the Y-axis direction.

As shown in FIG. 4, a flat plate 63 composed of a transparent material is provided in the cone sheet 6, and a plurality of circular cones 64 are formed on the back surface of the flat plate 63. The flat plate 63 is arranged parallel to the XY plane, and the circular cones 64 protrude in the −Z direction, that is, towards the optical waveguide 3. Specifically, the central axes of the circular cones 64 are parallel to each other, and are parallel to the Z-axis direction. The apex points of the circular cones 64 are arranged along the two directions that include the X-axis direction and a direction angled 60 degrees with respect to the X-axis direction in the XY plane. Specifically, the circular cones 64 are arranged in two dimensions on the light-incident surface of the flat plate 63, and the extension direction of an imaginary straight line that connects the apex points of the circular cones 64 makes a total of three directions that include the Y-axis direction and the direction 60 degrees with respect to the Y-axis direction in the XY plane. Connecting the apex points of three mutually adjacent circular cones 64 can thereby yield an imaginary equilateral triangle whose one side extends in the Y-axis direction.

In an example, the apex points of the circular cones 64 are arranged at an equal pitch in the Y-axis direction with an interval of 50 μm, and the side of the equilateral triangle formed by the apex points of the circular cones is 50 μm in length. The apex angle of the circular cones 64 is 70 degrees, and the height of the circular cones is 36 μm. The term "apex angle" refers to the angle formed by the sides of two circular cones in a cross-section that includes the central axes of the circular cones 64. A transparent resin is appropriate for use as the material of the optical waveguide 3 and cone sheet 6 due to its easy workability, but polymethyl methacrylate (PMMA: polymethyl methacrylate) having a refractive index of 1.5 is used in the present embodiment.

As shown in FIG. 2, a transmissive liquid crystal panel 7 is provided on the side opposite from the side on which the optical waveguide 3 is disposed as viewed from the cone sheet 6, specifically, on the +Z direction side, in the display device 2 that uses the light source device 1 according to the present first embodiment.

As shown in FIG. 3, this display device 2 is installed in a mobile telephone 9, for example. The display device 2 is arranged so that the transverse direction and the longitudinal direction of the mobile telephone correspond to the Y-axis direction and the X-axis direction, respectively, of the light source device. Specifically, the light source 51 (see FIG. 2) in the mobile telephone 9 is disposed on the top side of the display screen. The light source 51 may also be disposed on the bottom side of the display screen.

Figure 5:
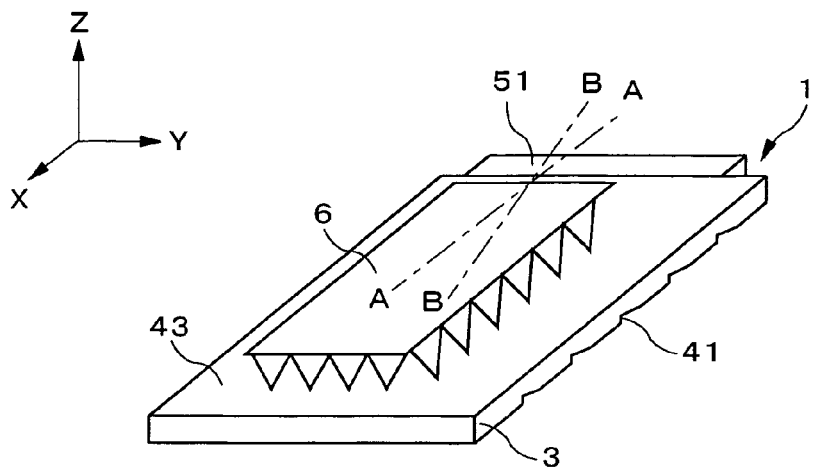
Figure 6:
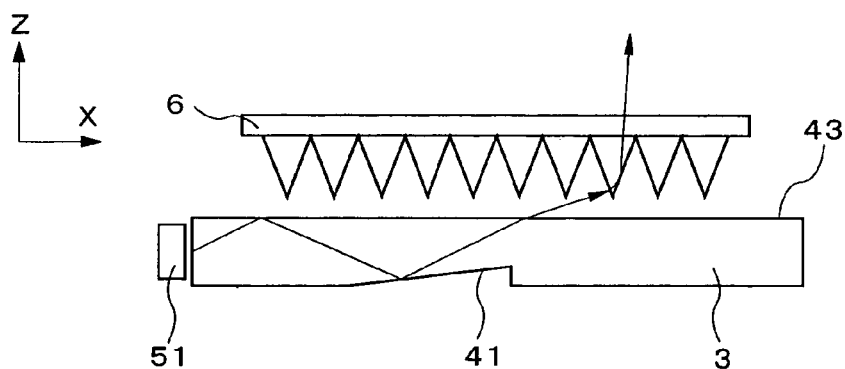
FIG. 6 is an optical model diagram of the cross-section along line A-A shown in FIG. 5.
Figure 7:
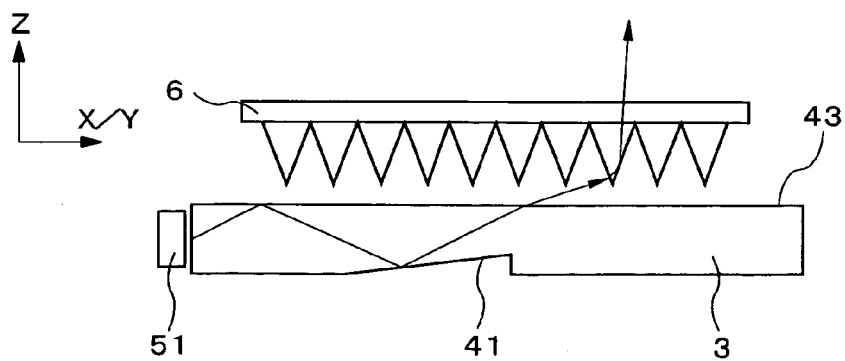
FIG. 7 is an optical model diagram of the cross-section along line B-B shown in FIG. 5.

The operation of the light source device 1 of the present embodiment thus configured will next be described. FIG. 5 is a perspective view showing an optical model of a case in which the light source 51 is on; FIG. 6 is a sectional view along line A-A shown in FIG. 5; and FIG. 7 is a sectional view along line B-B shown in FIG. 5. Line A-A extends in the X-axis direction, and line B-B extends in the direction that forms a 30-degree angle from the X-axis direction in the XY plane. Only one instance of the tilted surface 41 is shown in FIGS. 6 and 7 in order to simplify the drawings.

The behavior of light in the cross-section along line A-A shown in FIG. 6 will be described. Light emitted by the light source 51 is incident on the optical waveguide 3, but due to the difference in refractive index between the air and the resin material of the optical waveguide 3, the angle formed in the Z-axis direction by the +X direction and the direction in which the light is propagated after entering the optical waveguide 3 is smaller than 41.8 degrees based on Snell's law. Therefore, light rays will be considered that are tilted 41.8 degrees in the +Z direction with respect to the +X direction.

Light rays emitted from the light source 51 and directed to the optical waveguide 3 reach the light-exiting surface 43 of the optical waveguide 3, but since the angle thereof with respect to the Z-axis direction is 48.2 degrees, which is larger than the critical angle of 41.8 degrees, the light rays undergo total reflection without exiting from the optical waveguide 3. In the same manner, since total reflection also occurs in the light-diffusing surface 44 at the same angle when the light rays are incident on areas other than the tilted surface 41, the light rays are propagated away from the light source 51 while undergoing repeated total reflection between the light-exiting surface 43 and the light-diffusing surface 44. During this propagation, when the light is incident on the tilted surface 41 that is tilted 6 degrees with respect to the X-axis direction, the angle from the normal line of the tilted surface 41 is 42.2 degrees, but since this value is larger than the critical angle of 41.8 degrees, the light undergoes total reflection without exiting to the outside of the optical waveguide 3 from the tilted surface 41. The angle with respect to the Z-axis direction of the totally reflected light becomes 36.2 degrees, which is smaller than the critical angle. Therefore, the light that reaches the light-exiting surface 43 is emitted to the outside from the optical waveguide 3, and the post-emission angle is 62.4 degrees with respect to the Z-axis direction.

As previously mentioned, the light that has entered the optical waveguide 3 always has a post-incidence angle of 41.8 degrees or less with respect to the X-axis direction. The angle of this incident light therefore is 48.2 degrees or higher with respect to the Z-axis direction when the incident light reaches the light-exiting surface 43 or the light-diffusing surface 44 of the optical waveguide 3, and the light is totally reflected. In the process by which this light is then totally reflected in the light-exiting surface 43 and light-diffusing surface 44 and is propagated through the optical waveguide 3, the angle at which the light proceeds with respect to the Z-axis direction approaches the critical angle each time the light is totally reflected by the tilted surface 41 having a 6-degree tilt angle, and the light is emitted from the flat surface of the light-exiting surface 43 or light-diffusing surface 44 as soon as this angle becomes smaller than the critical angle. As a result, the light emitted from the optical waveguide 3 has strong directivity in the direction that is angled about 60 degrees from the +Z direction in the XZ plane.

The light emitted at an angle of 62.4 degrees with respect to the Z-axis direction from the optical waveguide 3 enters the cone sheet 6. However, since the apex angle of the circular cones 64 is 70 degrees, the angle at which the light enters the circular cones 64 is 7.4 degrees, and the angle between the normal to the incident surface of the circular cones and the propagation direction of the light rays entering into the circular cones 64 becomes 4.9 degrees. The light then reaches the side surface on the opposite side of the circular cones 64, but since the angle with respect to this side surface is 65.1 degrees from the surface-normal line, the light undergoes total reflection and proceeds in the direction 11.1 degrees from the Z-axis. The angle of the light emitted from the cone sheet 6 is then 16.8 degrees from the Z-axis, according to Snell's law. Specifically, the light emitted from the cone sheet 6 has strong directivity in the direction 16.8 degrees from the Z-axis in the XZ plane.

The behavior of light in the cross-section along line B-B shown in FIG. 7 will next be described. As previously mentioned, since the light source 51 is diffused at least in the XY plane, exactly the same theory applies in the cross-section along line B-B as in the cross-section along line A-A. As a result, the light emitted from the cone sheet 6 has high directivity and is at an angle 16.8 degrees from the +Z direction. This result occurs not only for line B-B, but also in the same manner for other angles within the XY plane. Therefore, the light emitted from the cone sheet 6 has high directivity in the direction tilted 16.8 degrees from the +Z direction. Specifically, the radiation range of the light source device 1 is limited to a narrow range of angles.

The operation of the display device 2 according to the present embodiment will next be described. As shown in FIG. 2, the light having high directivity emitted in the +Z direction from the light source device 1 enters the transmissive liquid crystal panel 7 and is transmitted through the transmissive liquid crystal panel 7. At this time, an image is associated with the transmitted light by actuating the transmissive liquid crystal panel 7. An image is thereby displayed.

Figure 8:
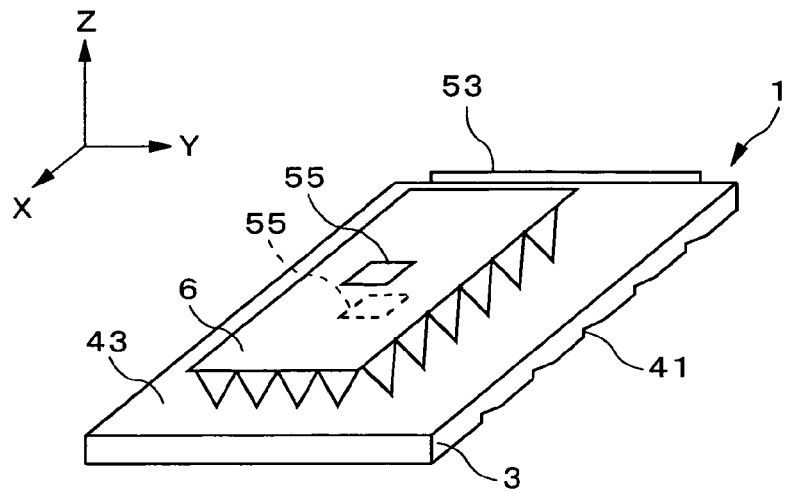
FIG. 8 is an optical model diagram for computer simulation in the first embodiment of the present invention.

A computer simulation was performed using a commercially available ray tracing simulator in order to investigate the validity of the design described above. FIG. 8 is a diagram showing the optical model used in this simulation. As shown in FIG. 8, the length in the X-axis direction, the width in the Y-axis direction, and the height in the Z-axis direction of the optical waveguide 3 were designed to be 60 mm, 40 mm, and 0.6 mm, respectively, and the light-emitting surface 53 as the light source was placed in the YZ plane on the side of the optical waveguide 3 in the −X direction so that the incidence direction was the +X direction. The width of the light-emitting surface 53 in the Y-axis direction was 40 mm, and the height in the Z-axis direction was 0.5 mm. A light-emitting surface that emitted Lambert light was used.

The tilted surface 41 was formed in the XY plane on the side of the optical waveguide 3 in the −Z direction. The tilted surface 41 was tilted at an angle of 6 degrees from the +X direction to the +Z direction, and was repeated continuously in the Y-axis direction. The maximum value of the depth of the Z-axis direction in the tilted surface 41 was set to 10 μm, and the pitch in the X-axis direction was set to 0.2 mm.

A cone sheet 6 that faced downward and had a plurality of circular cones with apex points facing in the −Z direction was provided on the side in the +Z direction as viewed from the optical waveguide 3. The circular cones were arranged so that the apex points of the circular cones formed equilateral triangles when viewed from the −Z direction, and so that one side thereof was parallel to the Y-axis direction. The pitch in the Y-axis direction of the cone apex points was 50 μm, and the length of the sides of the equilateral triangles formed by the apex points of the circular cones was 50 μm. The apex angle of the circular cones was set to 70 degrees, and the height was set to 36 μm. The thickness of the cone sheet 6, including the cone portions, was 0.1 mm. A light-receiving surface 55 having a length of 10 mm in the X-axis direction and a width of 10 mm in the Y-axis direction was installed on the side of the cone sheet 6 in the +Z direction. A light-receiving surface 55 having the same size was also installed between the optical waveguide 3 and the cone sheet 6 for the purpose of observing the intensity distribution of the light emitted from the optical waveguide 3. Polymethyl methacrylate having a refractive index of 1.5 was used as the material for the optical waveguide 3 and the cone sheet 6.

Figure 9:
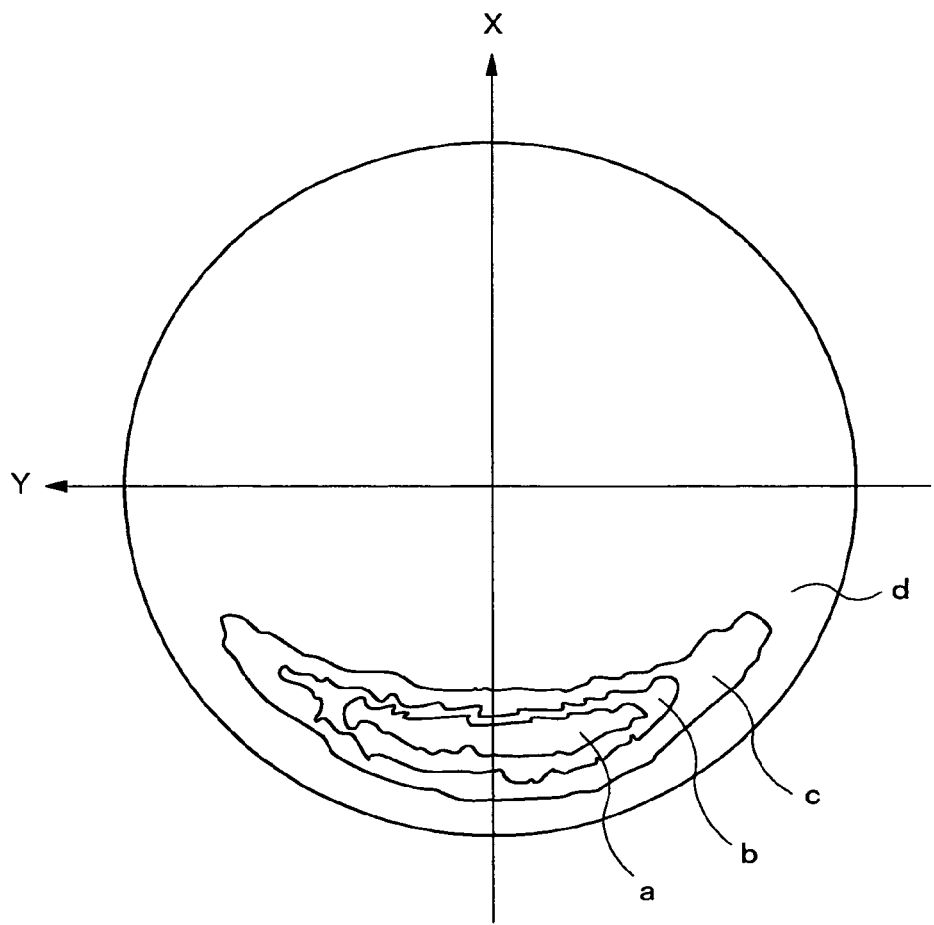
FIG. 9 is a diagram showing the simulation results when the light source is on in the first embodiment of the present invention, and shows the intensity distribution of the light when emitted from the optical waveguide.
Figure 10:
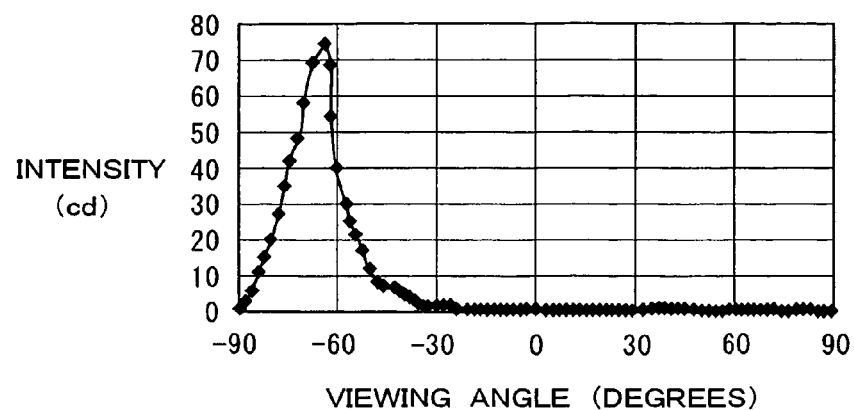
FIG. 10 is a graph showing the light intensity distribution in the X-axis direction in the light intensity distribution shown in FIG. 9, wherein the horizontal axis represents the viewing angle in the X-axis direction, and the vertical axis represents the light intensity.
Figure 11:
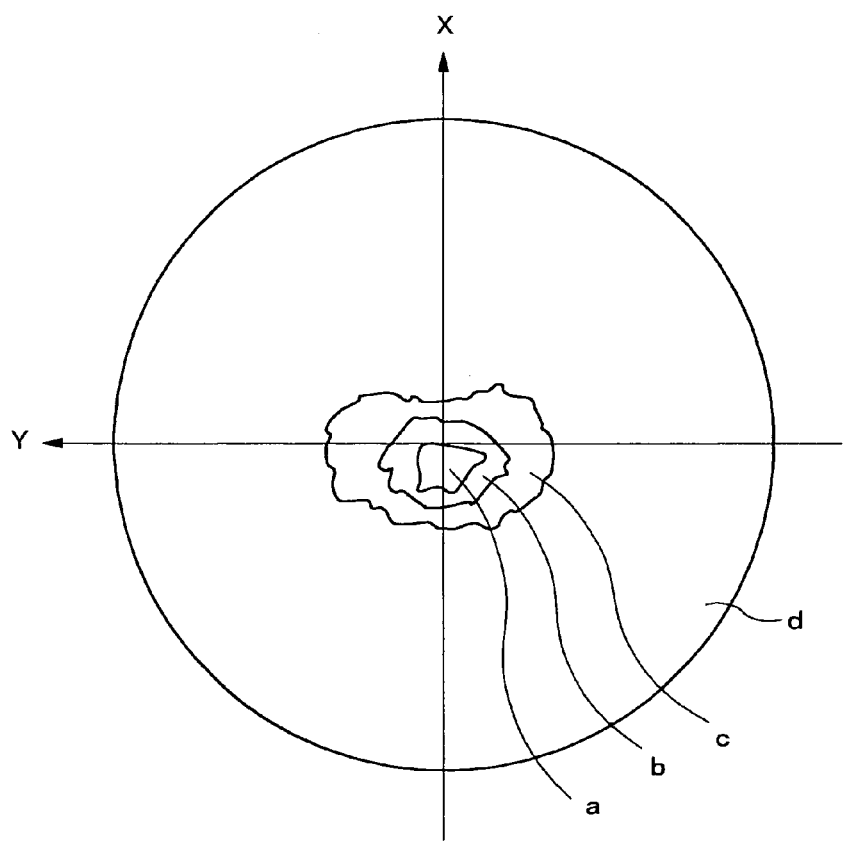
FIG. 11 is a diagram showing the simulation results when the light source is on in the first embodiment of the present invention, and shows the intensity distribution of the light when emitted from the cone sheet.
Figure 12:
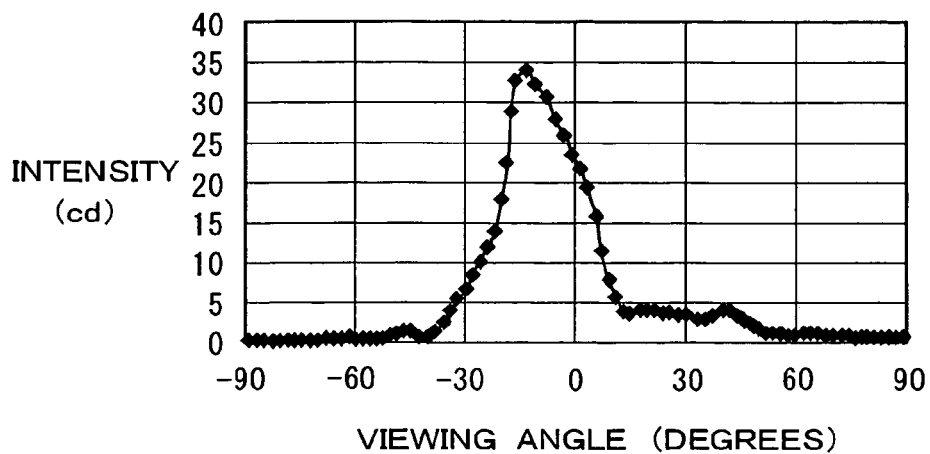
FIG. 12 is a graph showing the light intensity distribution in the X-axis direction in the light intensity distribution shown in FIG. 11, wherein the horizontal axis represents the viewing angle in the X-axis direction, and the vertical axis represents the light intensity.
Figure 13:
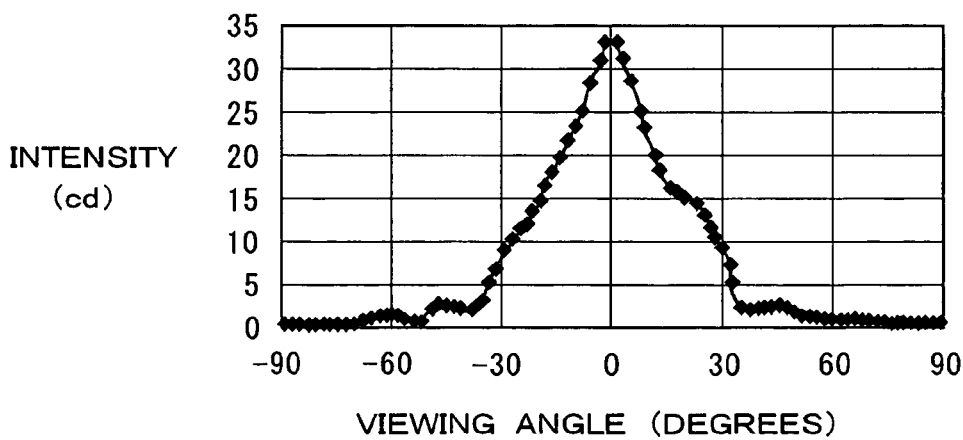
FIG. 13 is a graph showing the light intensity distribution in the Y-axis direction in the light intensity distribution shown in FIG. 11, wherein the horizontal axis represents the viewing angle in the Y-axis direction, and the vertical axis represents the light intensity.

The light intensity distribution when the light source was on will next be described. FIG. 9 is a polar coordinate diagram showing the light intensity distribution during emission from the optical waveguide when the light source was on, and the X direction and Y direction are shown in the drawing. FIG. 10 is a graph showing the light intensity distribution in the X-axis direction in the light intensity distribution shown in FIG. 9, wherein the viewing angle in the X-axis direction is plotted on the horizontal axis, and the light intensity is plotted on the vertical axis. FIG. 11 is a polar coordinate diagram showing the light intensity distribution during emission from the cone sheet when the light source was on, and the X direction and Y direction are shown in the drawing. FIG. 12 is a graph showing the light intensity distribution in the X-axis direction in the light intensity distribution shown in FIG. 11, wherein the viewing angle in the X-axis direction is plotted on the horizontal axis, and the light intensity is plotted on the vertical axis. FIG. 13 is a graph showing the light intensity distribution in the Y-axis direction in the light intensity distribution shown in FIG. 11, wherein the viewing angle in the Y-axis direction is plotted on the horizontal axis, and the light intensity is plotted on the vertical axis. In FIGS. 9 and 11, points having equal brightness are connected by solid lines, and the areas enclosed by the solid lines are designated as areas a, b, c, and d in order of brightness. Specifically, the brightest area was designated as area a, and the darkest area was designated as area d. The same applies in the other polar coordinate diagrams described hereinafter.

As shown in FIGS. 9 and 10, a peak in the light intensity distribution occurs in the direction tilted at −65 degrees in the X-axis direction from the +Z direction during emission from the optical waveguide. The tilt angle of the Y-axis direction is also distributed in relatively uniform fashion. As shown in FIGS. 11 through 13, the light intensity distribution during emission from the cone sheet is focused at 30 degrees or less in both the X-axis direction and the Y-axis direction. Specifically, it is apparent that the radiation range of the light source device is limited to a narrow range of angles, and the light is focused two-dimensionally when the light source is on.

The effects of the present embodiment will next be described. As described above, in the light source unit 1, the light source unit 1 can be made thinner since only the optical waveguide 3 and the cone sheet 6 are disposed in the thickness direction, specifically, the Z-axis direction. The light focusing effects of the cone sheet 6 make it possible to increase the directivity of the light emitted from the light source device 1 in both the X-axis direction and the Y-axis direction with respect to the emission direction, that is, the +Z direction. Specifically, the directivity of the emitted light can be increased in two dimensions.

The abovementioned light source device 1 is housed as the light source in the display device according to the present embodiment, making it possible to design a thinner device. Light can also be radiated in the frontal direction only, and a high-directivity display can be obtained. Power consumption can thereby be reduced while maintaining the luminosity of the screen with respect to a viewer observing from the frontal direction. Furthermore, since the abovementioned display device 2 is installed as the display device in the mobile terminal device of the present embodiment, a thin profile and lower power consumption can be achieved.

The tilt angle of the tilted surface 41 of the optical waveguide 3 is not limited by the aforementioned value, and another value may be selected insofar as the same effects are demonstrated. The material used for the optical waveguide is also not limited to the aforementioned material. Furthermore, the depth and pitch of the tilted surface are also not limited to the aforementioned values, and may differ within the optical waveguide. A range of tilt angles for the tilted surface may also be distributed within the optical waveguide. By increasing the pitch of the tilted surface near the light source in the optical waveguide, the luminance distribution can be made uniform in the light-emitting plane of the light source device. Since it is also sufficient if the optical waveguide can emit light in a direction 60 degrees from the direction of the normal to the emitting surface, an optical waveguide can be used in which a matt pattern is printed on the emitting surface, as in the second conventional light source device. A wedge-shaped scattering optical waveguide may also be used, as in the third conventional light source device.

The apex angle, height, pitch, thickness, and other aspects of the cone sheet are also not limited by the aforementioned values, and different values may be selected insofar as the same effects are demonstrated. The material used for the cone sheet is also not limited by the aforementioned material. The apex points of the circular cones were also positioned so as to form an equilateral triangle, but this configuration is not limiting, and the apex points may form a shape other than an equilateral triangle. The side of the triangle is also not necessarily completely parallel to the Y-axis, and may be positioned at an angle with respect to the Y-axis in order to prevent moiré with the display panel. However, the phase of the positions of the cone apex points in the X-axis direction is preferably not uniform in relation to the Y-axis direction. By this configuration, light emitted by the optical waveguide when the light source is on can be more efficiently focused in the Z-axis direction than when the phase in the X-axis direction is uniform in relation to the Y-axis direction. Furthermore, a diffusion pattern may be provided to the surface on the opposite side from the surface on which the circular cones are formed in the cone sheet. Moiré can thereby be prevented from occurring with the display panel.

The distal ends of the circular cones in the cone sheet used in the light source device of the present invention may be rounded to an extent that does not significantly diminish the two-dimensional light-focusing effects. The shape thereof is not limited to a cone, and another shape may be applied in the same manner insofar as a fine two-dimensional pattern is arranged in repeating fashion, and the shape has two-dimensional light-focusing effects.

Figure 14:
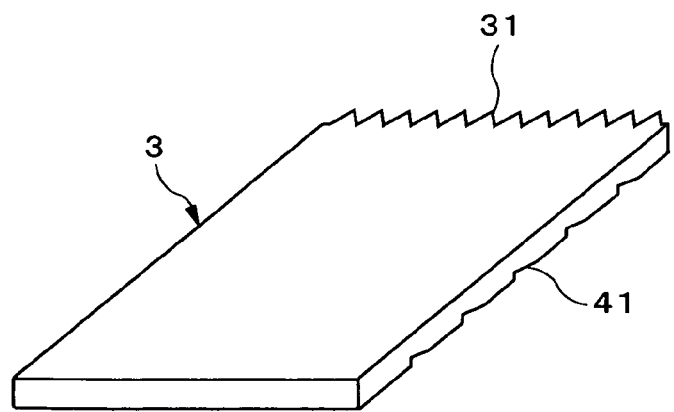
FIG. 14 is a perspective view showing the optical waveguide having a diffusion pattern provided to the light-incident surface.
Figure 15:
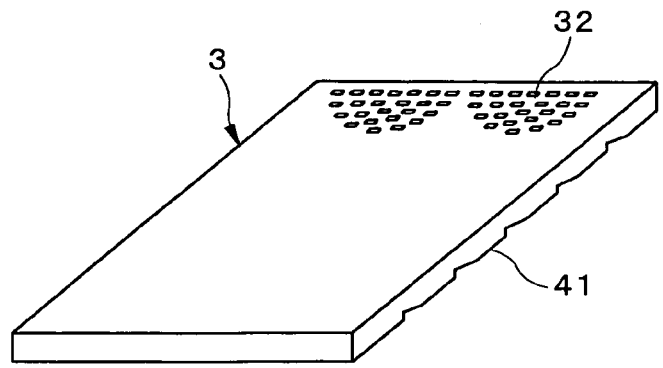
FIG. 15 is a perspective view showing the optical waveguide having a two-dimensional pattern provided to the light-exiting surface.

A cold cathode tube or other linear light source may also be used for the light source, and an LED or other point light source may also be used. The thickness of the light source can be reduced particularly when an LED is used, but providing a diffusion pattern 31 to the light-incident surface of the optical waveguide as shown in FIG. 14 is effective for making a point light source into a uniform linear light source. As shown in FIG. 15, a two-dimensional pattern 32 may be formed on the light-exiting surface 43 of the optical waveguide. The two-dimensional pattern 32 is composed, for example, of a plurality of depressions distributed in a semicircular area. The two-dimensional pattern 32 is particularly effective for making the light from the light source uniform when placed near the light source. As previously mentioned, a plurality of LEDs may be disposed on the light-incident surface of the optical waveguide.

The display panel used in the present invention is not limited to a liquid crystal panel, and any display panel that uses a light source device may be used. The liquid crystal panel is also not limited to the transmissive type, and any panel that has a transmissive area in each pixel may be used. A transflective liquid crystal panel having a reflective area in a portion of each pixel, a visible-everywhere transflective liquid crystal panel, or a micro-reflective liquid crystal panel may also be used.

The display device of the present embodiment may be suitably installed in a mobile telephone or other mobile terminal device. As previously mentioned, since the directivity of the emitted light is increased in two dimensions by the display device of the present embodiment, it becomes possible to reduce power consumption. Compatible mobile terminal devices include not only mobile telephones, but also PDAs, gaming devices, digital cameras, digital video cameras, and various other types of mobile terminal devices. [The display device] may be installed not only in mobile terminal devices, but also in video players, notebook-type personal computers, cash dispensers, vending machines, and other various types of terminal devices.

Figure 16:
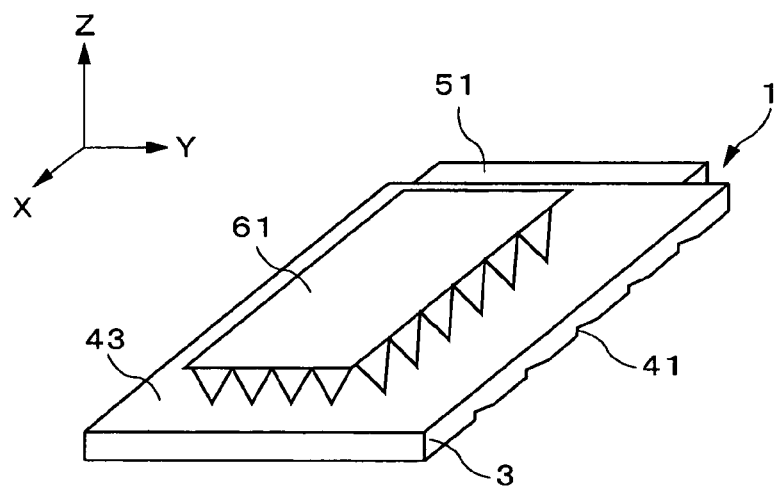
FIG. 16 is a perspective view showing the light source device according to a second embodiment of the present invention.
Figure 17:
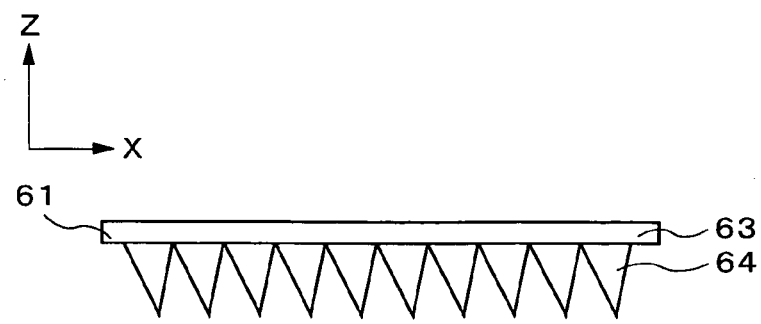
FIG. 17 is a sectional view in the XZ plane of the cone sheet in the second embodiment of the present invention.

The light source device according to a second embodiment of the present invention will next be described. FIG. 16 is a perspective view showing the light source device of the present embodiment; and FIG. 17 is a sectional view in the XZ plane of the cone sheet used in the light source device of the present embodiment. As shown in FIGS. 16 and 17, the light source device 11 of the present embodiment is provided with the cone sheet 61 instead of the cone sheet 6 in the light source device 1 (see FIG. 1) of the previously described first embodiment. In the cone sheet 61, the circular cones 64 are tilted 10 degrees towards the +X direction. Other aspects of the present embodiment are the same as in the previously described first embodiment.

Figure 18:
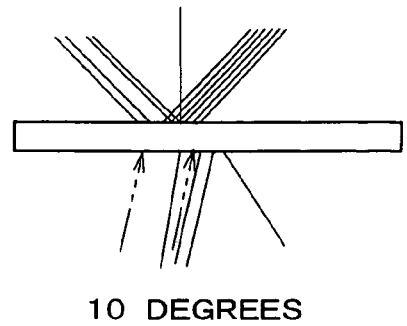
FIGS. 18A through 18G show the results of simulating the emitted light when the direction of light rays incident on the cone sheet is changed, in order to show the optical operation of the cone sheet provided with circular cones having a tilt angle of 10 degrees; wherein FIGS. 18A, B, C, D, E, F, and G show the results when the incidence angle is changed 10 degrees, 20 degrees, 30 degrees, 40 degrees, 50 degrees, 60 degrees, and 70 degrees from the Z-axis, respectively.
Figure 18:
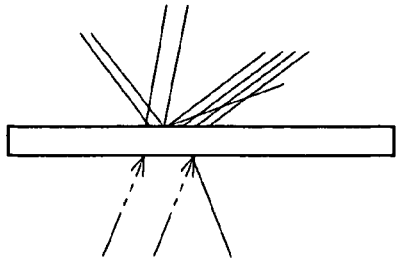
Figure 18:
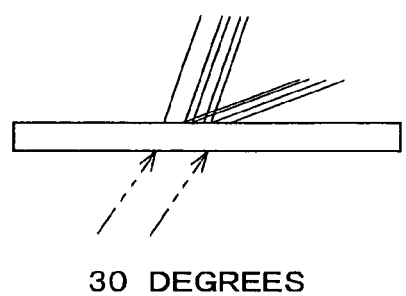
Figure 18:
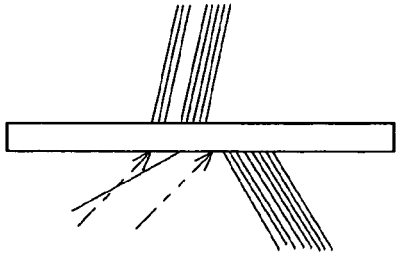
Figure 18:
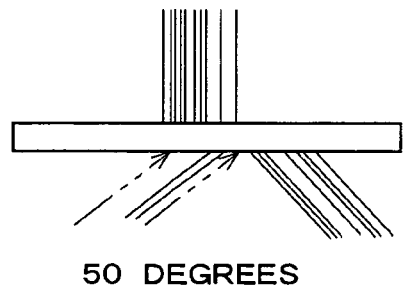
Figure 18:
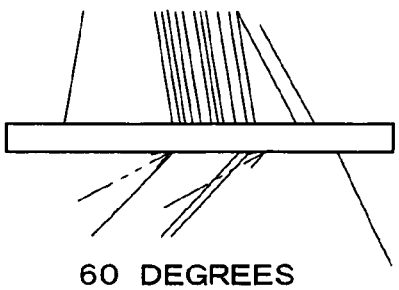
Figure 18:
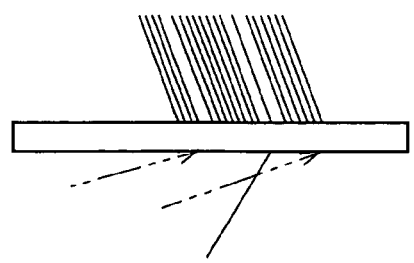

The operation of the light source device 11 of the present embodiment thus configured will next be described. In the present embodiment, the operation until the light emitted by the light source 51 is emitted from the optical waveguide 3 is the same as in the first embodiment. The operation of the cone sheet 61 in the present embodiment differs from the first embodiment. Therefore, attention will be given to the operation of the cone sheet 61 having tilted circular cones. FIGS. 18A through 18G show the results of simulating the emitted light when the direction of light rays incident on the cone sheet is changed, in order to show the optical operation of the cone sheet 61 that has tilted circular cones and is used in the present embodiment. FIGS. 18A, B, C, D, E, F, and G show the results when the incidence angle is changed 10 degrees, 20 degrees, 30 degrees, 40 degrees, 50 degrees, 60 degrees, and 70 degrees from the Z-axis, respectively. In FIG. 18, the two double-dashed lines with arrows indicate the outer edges of the incident luminous flux, and solid lines without arrows indicate the emitted light rays.

It is apparent from FIGS. 18A through 18G that when the incidence angle of light is changed, the emitted light proceeds in various directions, but light rays in particular having incidence angles 60 degrees and 70 degrees from the Z-axis are deflected in the frontal direction.

Figure 19:
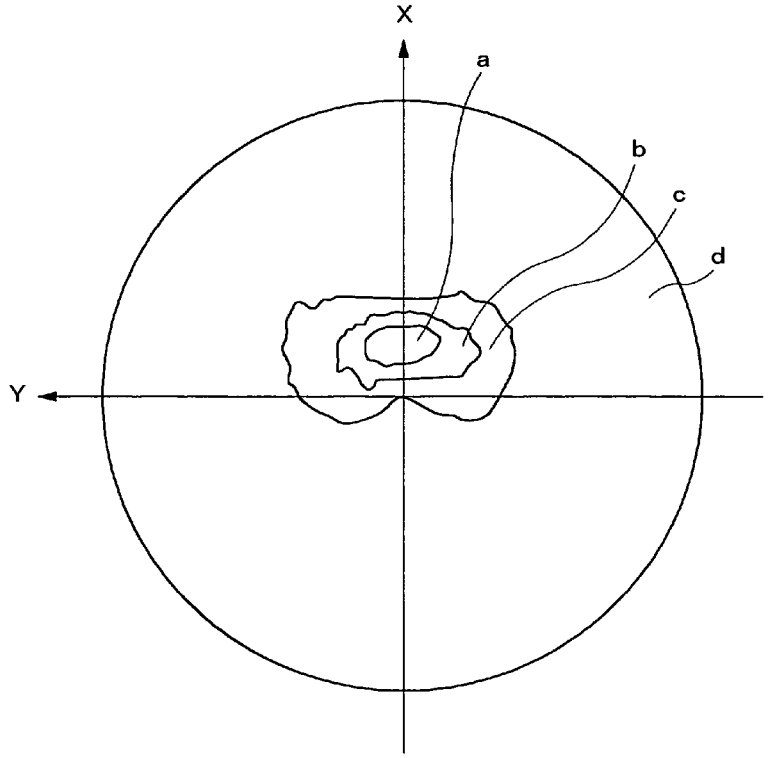
FIG. 19 is a diagram showing the simulation results when the light source is on in the second embodiment of the present invention, and shows the intensity distribution of the light when emitted from the cone sheet.
Figure 20:
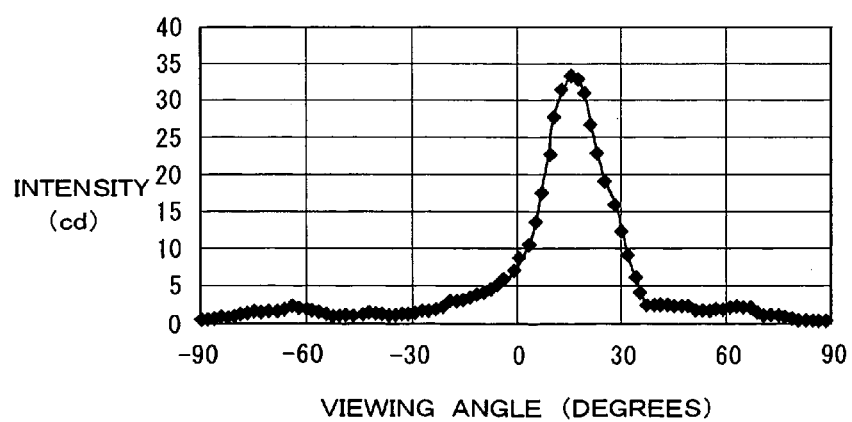
FIG. 20 is a graph showing the light intensity distribution in the X-axis direction in the light intensity distribution shown in FIG. 19, wherein the horizontal axis represents the viewing angle in the X-axis direction, and the vertical axis represents the light intensity.
Figure 21:
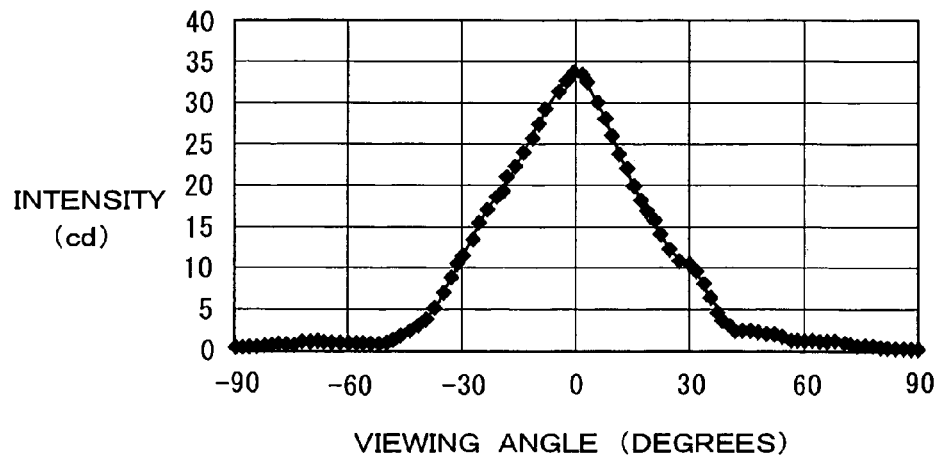
FIG. 21 is a graph showing the light intensity distribution in the Y-axis direction in the light intensity distribution shown in FIG. 19, wherein the horizontal axis represents the viewing angle in the Y-axis direction, and the vertical axis represents the light intensity.

A computer simulation was performed in the same manner as in the first embodiment by using a commercially available ray tracing simulator in order to perform a detailed investigation of the abovementioned design. The optical model was the same as in the first embodiment, except that the circular cones were tilted 10 degrees in the +X direction. FIG. 19 is a polar coordinate diagram showing the intensity distribution of light during emission from the cone sheet when the light source was on, wherein the X direction and Y direction are shown. FIG. 20 is a graph showing the light intensity distribution in the X-axis direction in the light intensity distribution shown in FIG. 19, wherein the horizontal axis represents the viewing angle in the X-axis direction, and the vertical axis represents the light intensity. FIG. 21 is a graph showing the light intensity distribution in the Y-axis direction in the light intensity distribution shown in FIG. 19, wherein the horizontal axis represents the viewing angle in the Y-axis direction, and the vertical axis represents the light intensity. As shown in FIGS. 19 through 21, the light intensity distribution during emission from the cone sheet is focused within 30 degrees in both the X-axis direction and the Y-axis direction, and the center in particular can be caused to approach the front. The tilt angle of the circular cones is not limited to 10 degrees, and a different value may be selected insofar as the same effects are demonstrated.

Figure 22:
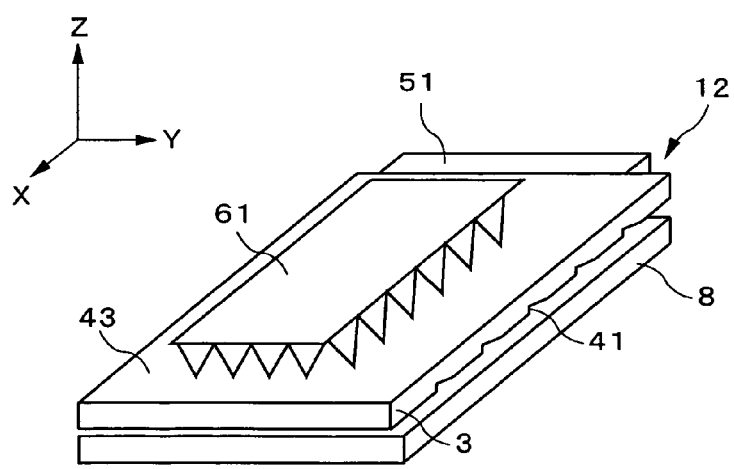
FIG. 22 is a perspective view showing the light source device according to a third embodiment of the present invention.

The light source device according to a third embodiment of the present invention will next be described. FIG. 22 is a perspective view showing the light source device of the present embodiment. As shown in FIG. 22, in the light source device 12 of the present embodiment, a reflecting panel 8 is mounted so as to face the light-diffusing surface 44 of the optical waveguide 3 in the –Z direction as viewed from the optical waveguide 3. The reflecting panel 8 reflects towards the optical waveguide 3 the light emitted from the light-diffusing surface 44 of the optical waveguide 3 due to scattering and other causes. Aspects of the configuration in the present embodiment other than those described above are the same as in the previously described second embodiment.

Figure 23:
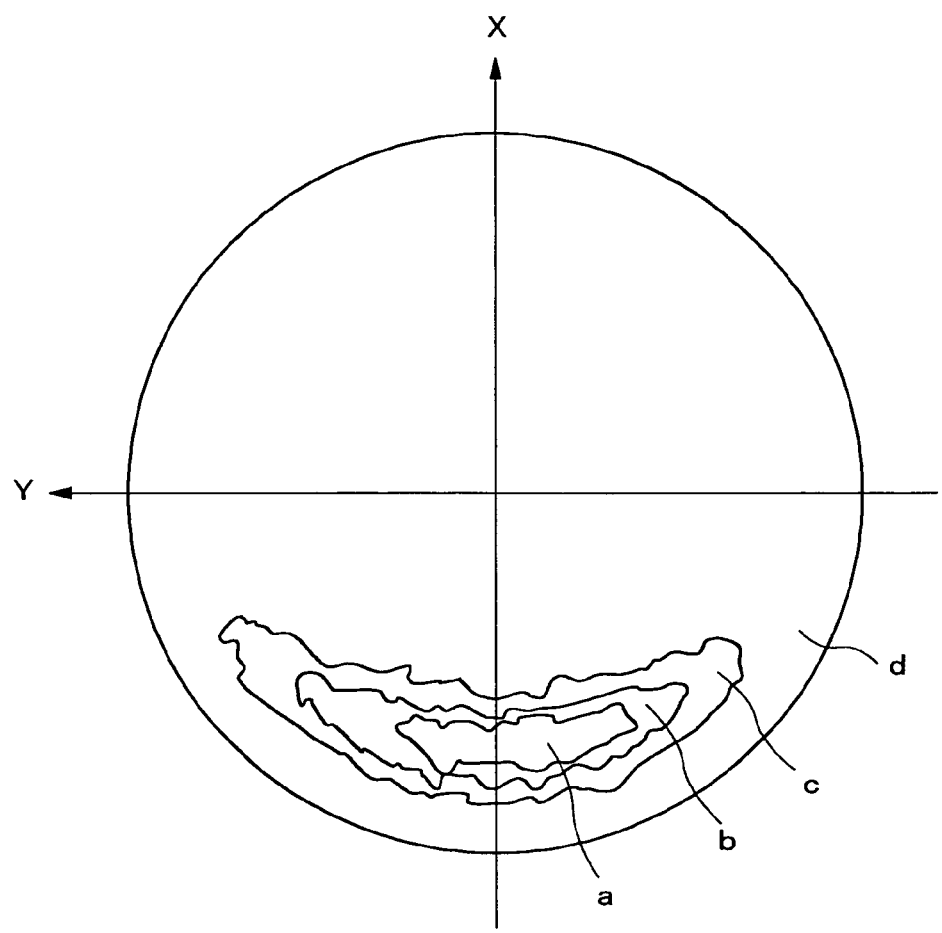
FIG. 23 is a diagram showing the simulation results when the light source is on in the third embodiment of the present invention, and shows the intensity distribution of the light when emitted from the optical waveguide.
Figure 24:
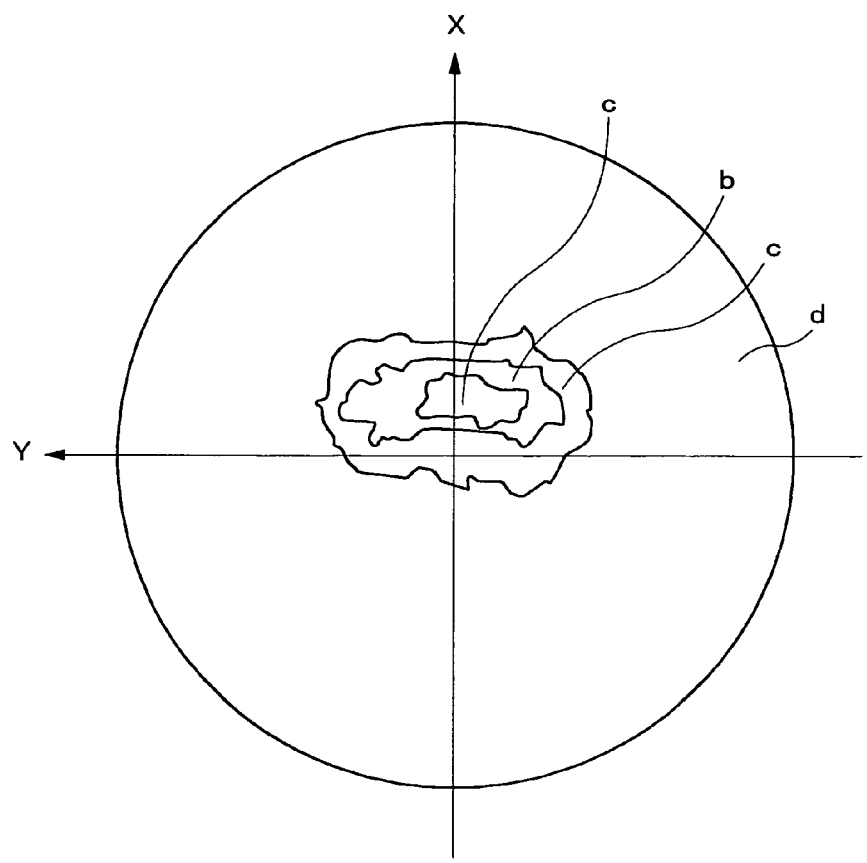
FIG. 24 is a diagram showing the simulation results when the light source is on in the third embodiment of the present invention, and particularly shows the intensity distribution of the light when emitted from the cone sheet.
Figure 25:
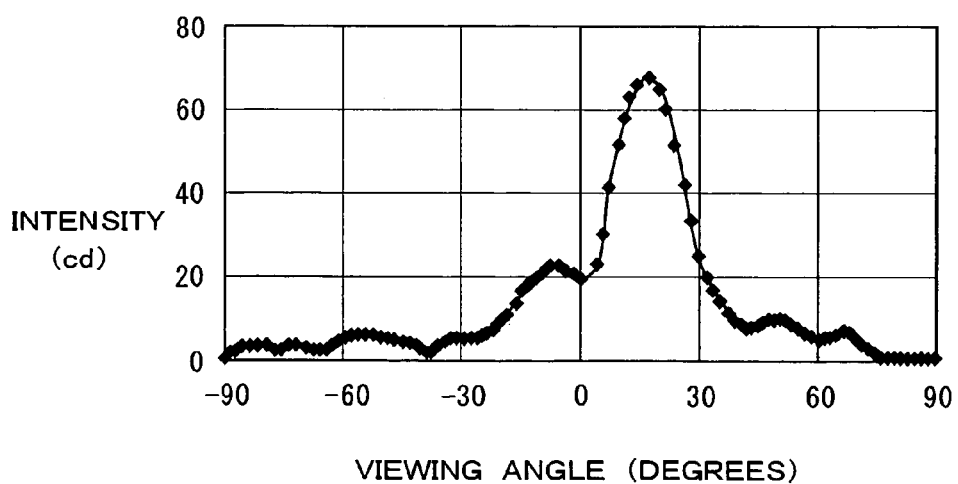
FIG. 25 is a graph showing the light intensity distribution in the X-axis direction in the light intensity distribution during cone sheet emission shown in FIG. 24, wherein the horizontal axis represents the viewing angle in the X-axis direction, and the vertical axis represents the light intensity.
Figure 26:
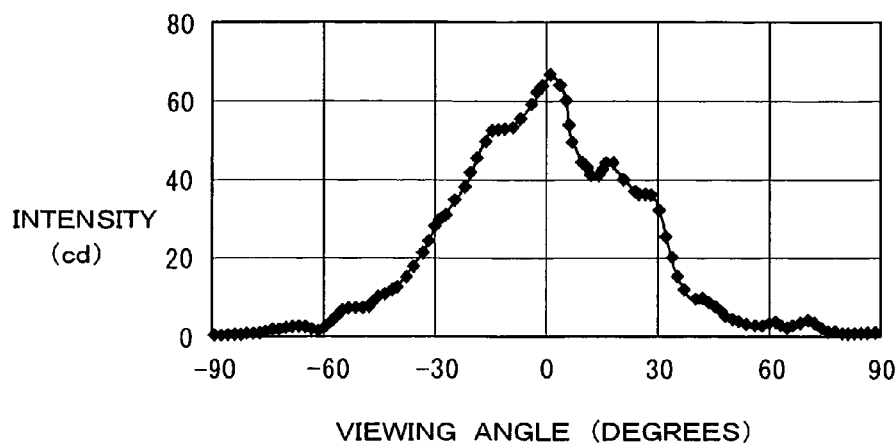
FIG. 26 is a graph showing the light intensity distribution in the Y-axis direction in the light intensity distribution during cone sheet emission shown in FIG. 24, wherein the horizontal axis represents the viewing angle in the Y-axis direction, and the vertical axis represents the light intensity.

A computer simulation was performed in the same manner as in the first embodiment using a commercially available ray tracing simulator in order to investigate the validity of the abovementioned design. The optical model was the same as in the first embodiment, except that the reflecting panel 8 was mounted towards the –Z direction of the optical waveguide 3. FIGS. 23 and 24 are polar coordinate diagrams showing the intensity distribution of light during emission from the optical waveguide and the cone sheet, respectively, when the light source is on. The X direction and Y direction are shown in the drawings. FIG. 25 is a graph showing the luminance distribution in the X-axis direction in the light intensity distribution during cone sheet emission shown in FIG. 24, wherein the horizontal axis represents the viewing angle in the X-axis direction, and the vertical axis represents the light intensity. FIG. 26 is a graph showing the luminance distribution in the Y-axis direction in the light intensity distribution during cone sheet emission shown in FIG. 24, wherein the horizontal axis represents the viewing angle in the Y-axis direction, and the vertical axis represents the light intensity.

As shown in FIG. 23, a peak in the light intensity distribution occurs in the direction tilted at 65 degrees from the Z-axis during emission from the optical waveguide, and there is no decrease in directivity relative to the first embodiment of the present invention. As shown in FIGS. 25 and 26, the light intensity distribution during emission from the cone sheet is focused within 30 degrees in both the X-axis direction and the Y-axis direction, and the intensity is increased in comparison to the first embodiment of the present invention, in which the reflecting panel was not provided. Specifically, the light from the light source can be utilized more effectively without compromising directivity. The effects of the present embodiment other than those described above are the same as in the previously described second embodiment.

Figure 27:
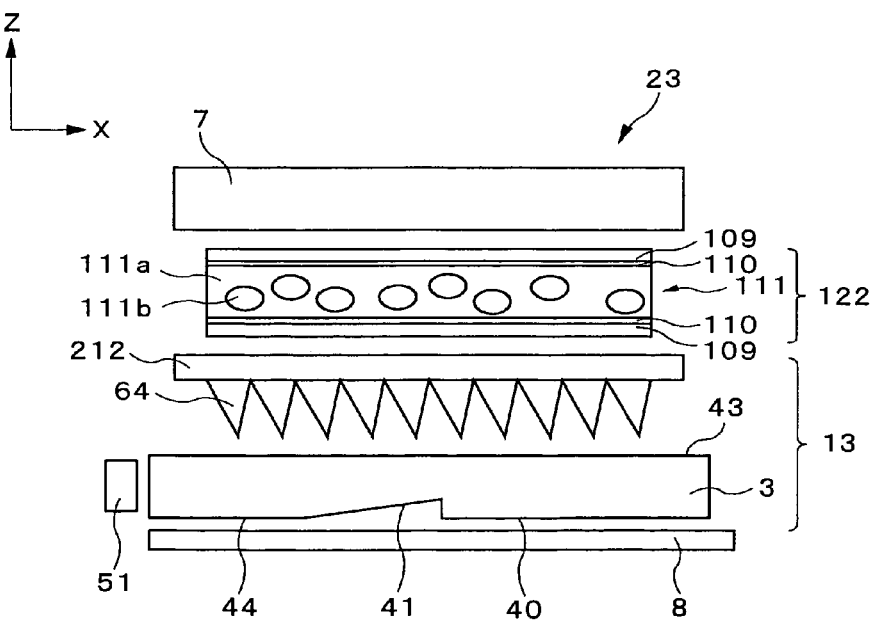
FIG. 27 is a sectional view showing the display device according to a fourth embodiment.
Figure 28:
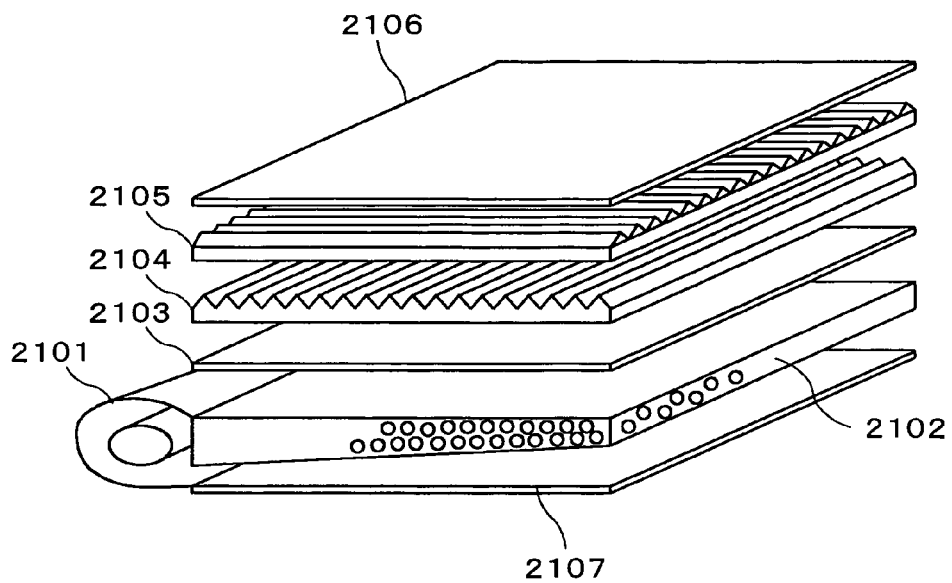
FIG. 28 is a perspective view showing the first conventional light source device.
Figure 29:
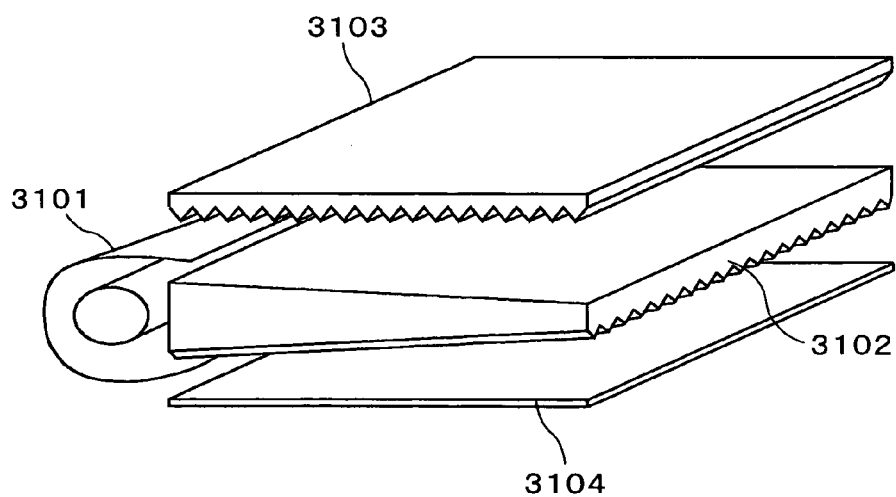
FIG. 29 is a perspective view showing the second conventional light source device.
Figure 30:
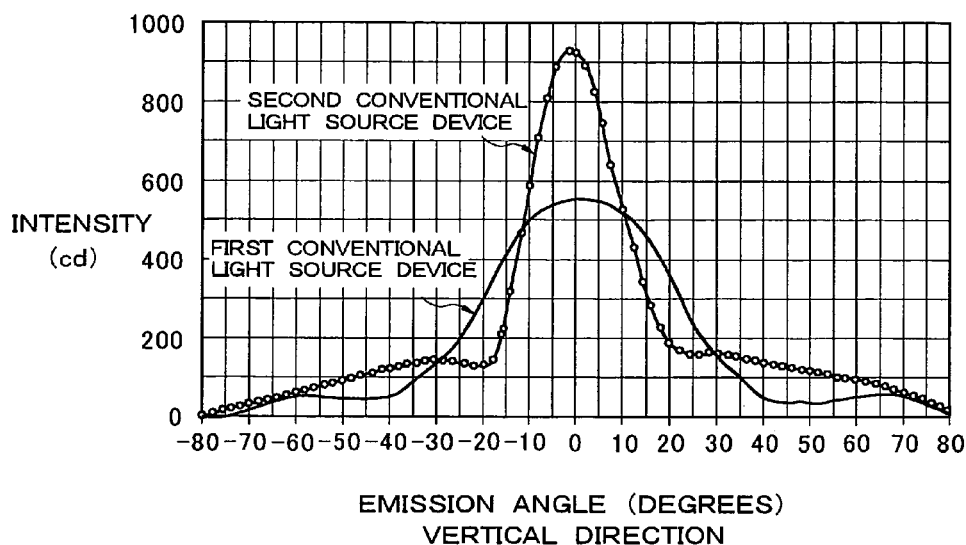
FIGS. 30A and 30B are graphs showing the results of comparing the directivity characteristics of the second conventional light source device with the directivity characteristics of the first conventional light source device, wherein the horizontal axis represents the exit angle, and the vertical axis represents the light intensity.
Figure 30:
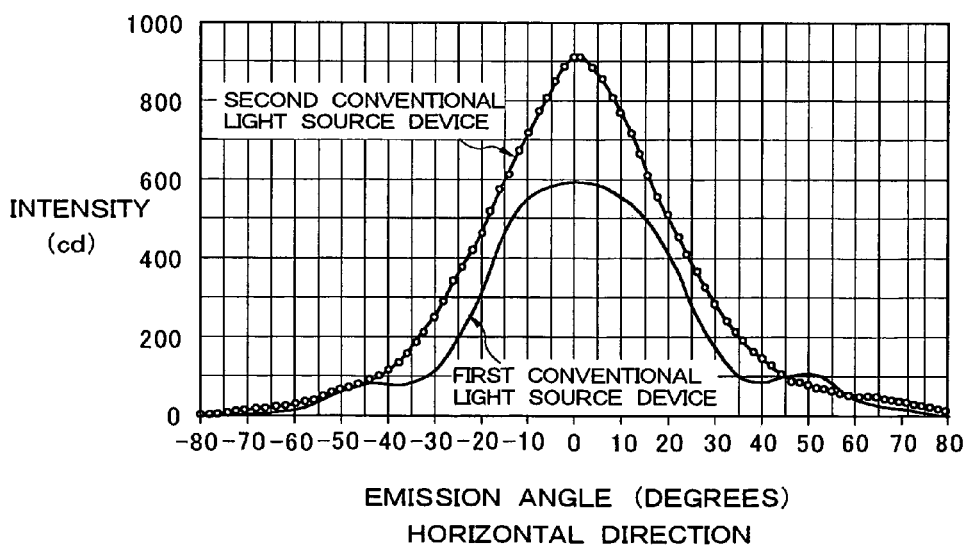
Figure 31:
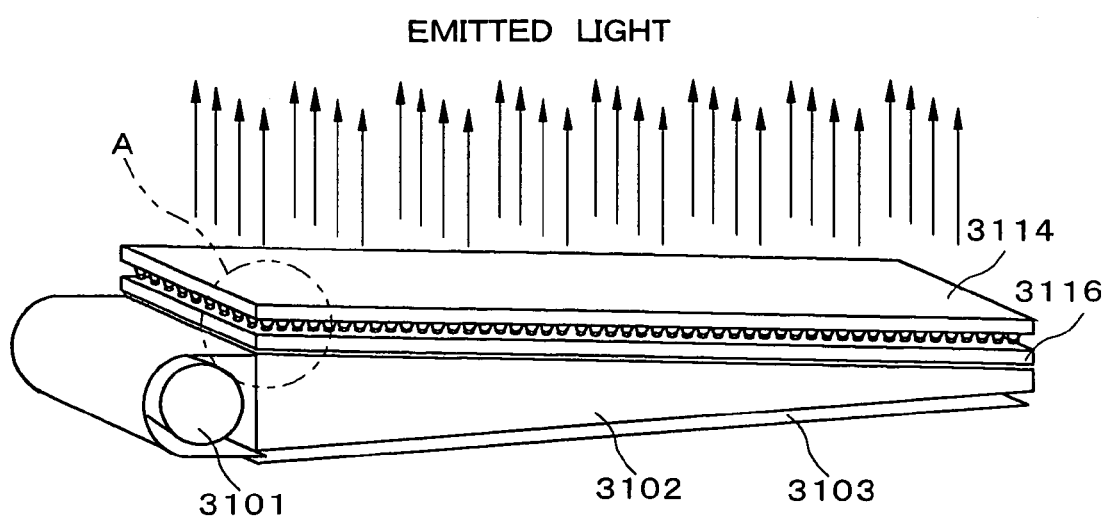
FIG. 31 is a schematic perspective view showing the third conventional light source device.
Figure 32:
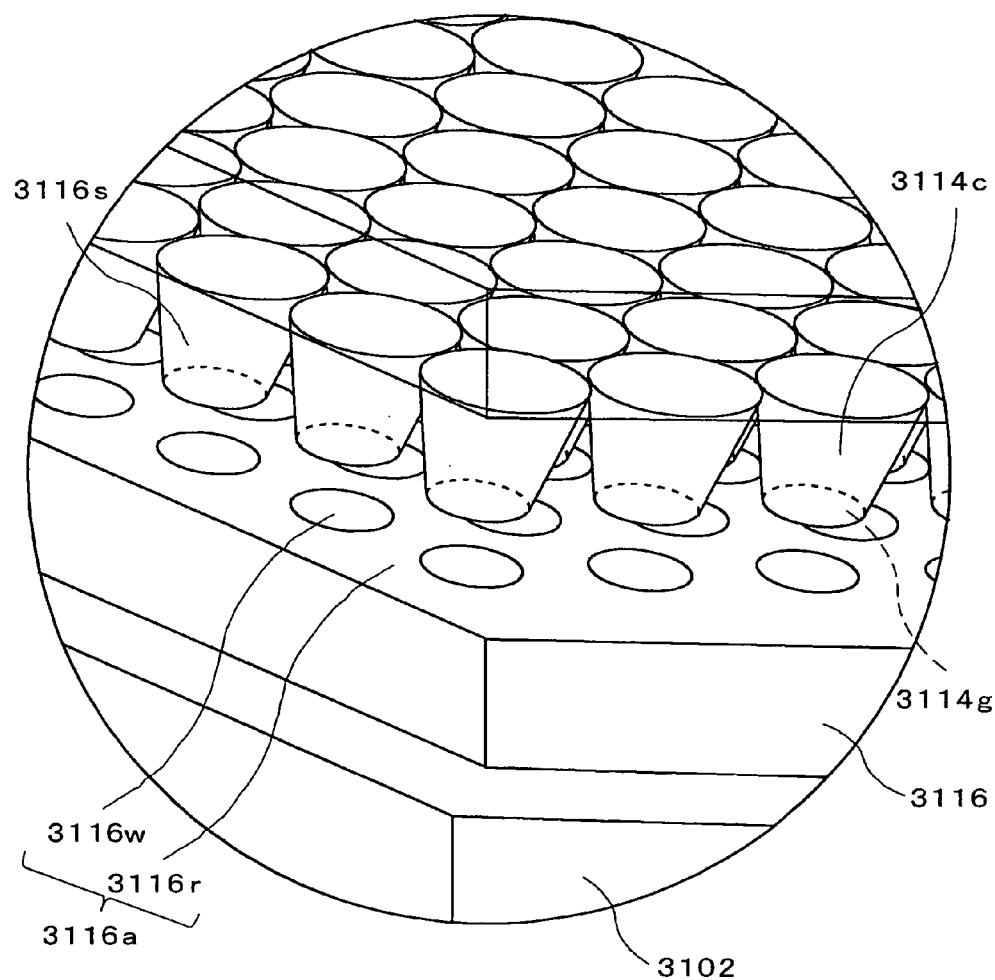
FIG. 32 is a partial enlarged view showing area A in FIG. 31.

The light source device and the display device that uses the light source device according to a fourth embodiment of the present invention will next be described. FIG. 27 is a sectional view showing the display device of the present fourth embodiment. In the light source device 22 of the present embodiment, a transparent/scattering state switching element 122 is provided on the light source device 12 described in the third embodiment of the present invention, specifically, on the +Z-side of the cone sheet. A pair of transparent substrates 109 arranged parallel to each other is provided in the transparent/scattering state switching element 122, and electrodes 110 are provided so as to cover the surface in each transparent substrate that faces the other transparent substrate. A PDLC (Polymer Dispersed Liquid Crystal) layer 111 in which liquid crystal molecules 111b are dispersed in a polymer matrix 111a is provided between the electrodes 110. The orientation state of the liquid crystal molecules in the PDLC layer is changed by using the pair of electrodes 110 to apply a voltage to the PDLC layer 111 sandwiched between the electrodes. The PDLC layer 111 is formed, for example, by curing a mixture of a photocuring resin and a liquid crystal material by exposure to light. The transparent/scattering state-switching element 122 scatters or transmits light that is incident from the light source device 12, and emits the light to the liquid crystal panel 7.

When light having high directivity in two dimensions is emitted from the light source device 12 as previously mentioned in the display device formed as described above, and the light in this distribution enters the transparent/scattering state switching element 122 that is in the transparent state, the high-directivity light is transmitted without modification through the transparent/scattering state switching element 122, and high-directivity light is emitted. This light is transmitted through the liquid crystal panel 7 and caused to create a narrow-angle display that is visible only near the front. When the transparent/scattering state switching element 122 is in the scattering state, the incident light is scattered by the transparent/scattering state switching element 122 and converted to wide-angle light having decreased directivity. Since the distributed light that is spread over a wide range is also emitted in a state of wide distribution after being transmitted through the liquid crystal panel 7, an image is displayed in a wide viewing angle.

In the present embodiment, it is possible to switch between narrow-angle display and wide-angle display by using the transparent/scattering state switching element 122 to transmit or scatter the high-directivity light emitted from the light source device 12. The display device can thereby be endowed with a variable viewing angle.

The display panel used in the display device of the present invention is not limited to a transmissive liquid crystal panel, and any display panel that uses a light source device may be used. It is particularly suitable to use a liquid crystal panel that has minimal dependence on viewing angle. Examples of the mode of such a liquid crystal panel include IPS (In-Plane Switching), FFS (Fringe Field Switching), AFFS (Advanced Fringe Field Switching), and the like among horizontal field modes. Vertical alignment modes include MVA (Multi-domain Vertical Alignment), which is multi-domain and possesses reduced viewing-angle dependency, PVA (Patterned Vertical Alignment), ASV (Advanced Super V), and the like. Furthermore, a film-compensated TN liquid crystal display panel may also be appropriately used.

The transparent/scattering state switching element used in the display device of the present invention is not limited to having a PDLC layer, and any element capable of switching between a transparent state and a scattering state may be appropriately used. Examples thereof may include an element that uses a polymer network liquid crystal (PNLC), or an element that uses dynamic scattering (DS). In the aforementioned PDLC layer, a scattering state is established when a voltage is not applied, and a transparent state is established when a voltage is applied. The brightness of the light source device during the scattering state can thereby be enhanced since the transparency/dispersion element consumes no power when in the state where incident light is scattered, and the power that would have been consumed is allocated to the backlight light source. It is also possible to use a PDLC layer that is in the transparent state when a voltage is not being applied, and in the scattering state when a voltage is applied. This type of PDLC layer is obtained by curing with exposure to light while applying a voltage. In this configuration, there is no need to apply a voltage to the PDLC layer, and power consumption can be suppressed in a mobile information terminal device in which a narrow-angle display is frequently used.

The light source device of the present embodiment may be suitably applied in a mobile telephone or other mobile terminal device, and it becomes possible to switch the viewing angle of the display in the display device installed in the mobile terminal device. Particularly when the light source device of the present embodiment is installed in a mobile telephone, the transverse direction and longitudinal direction of the mobile telephone may be set to the Y-axis direction and X-axis direction, respectively, of the light source device. Directivity in the transverse direction can thereby be controlled when the light source is disposed in the vertical direction of the display screen. The width of a mobile telephone is generally limited to a size that allows easy handling, but the width of the display area is preferably increased in order to display text information. Therefore, the area not occupied by the display in the width direction of the mobile telephone tends to be small. The light source device of the present invention has the advantage of being able to reduce the width of the non-display area to the left and right of the display screen, since there is no need to place the light source to the left and right of the display screen.

In the display device of the present embodiment, the total thickness is increased by an amount commensurate with the thickness of the transparent/scattering state switching element. However, since the light source device can be made thinner in the present embodiment, the thickness of the display device can be made equal to or less than the thickness of the conventional display device. Compatible mobile terminal devices include not only mobile telephones, but also PDAs, gaming devices, digital cameras, digital video cameras, video players, and various other types of mobile terminal devices. Compatible terminal devices include notebook-type personal computers, cash dispensers, vending machines, and other various types of terminal devices.

The light source device used in combination with the transparent/scattering state switching element is also not limited by the third embodiment of the present invention, and the light source device according to the first or second embodiment of the present invention may be used.

The present invention can be suitable for use as the display device of a mobile telephone, a PDA, a gaming device, a digital camera, a video camera, a video player, or other mobile terminal device, and as the display device of a notebook-type personal computer, a cash dispenser, a vending machine, or other terminal device.

What is claimed is:

1. A light source device comprising:
    a light source;
    a light-guiding member for emitting light incident from the light source in a first direction that is different from the incidence direction of the light; and
    an optical member which totally reflects the light incident from the light-guiding member and emits light in a second direction that is different from said first direction;
    wherein
    said optical member has a flat plate composed of a transparent material, and a plurality of circular cones composed of a transparent material and formed on the surface that faces said light-guiding member in said flat plate, said circular cones totally reflecting the incident light;
    the central axes of said circular cones are parallel to each other;
    heights of all of said circular cones are the same as each other and there are three imaginary straight lines that link the apex points of said circular cones which are parallel to the surface of said flat plate and have three mutually different directions.

2. The light source device according to claim 1, wherein the phase of one row that comprises the apex points of said circular cones differs from the phase of the other rows.

3. The terminal device according to claim 2, wherein the one row is arranged parallel to a normal line of a light-incident surface of the light-guiding member.

4. The terminal device according to claim 2, wherein the central axes of said circular cones are tilted with respect to the direction perpendicular to the surface of said flat plate so that said second direction is perpendicular to the surface of said flat plate, and
    wherein the central axes of the circular cones are tilted in a direction facing away from the light source.

5. The light source device according to claim 1, wherein the central axes of said circular cones are tilted with respect to the direction perpendicular to the surface of said flat plate so that said second direction is perpendicular to the surface of said flat plate.

6. The terminal device according to claim 5, wherein the central axes of the circular cones are tilted in a direction facing away from the light source.

7. The light source device according to claim 1, wherein a diffusion pattern for diffusing the transmitted light is formed on the surface of the side on which said circular cones are not formed in said flat plate.

8. The light source device according to claim 1, wherein said light source comprises
a point light source; and
a diffusion pattern for diffusing the light is formed on the surface of said light-guiding member on which light from said point light source is incident for converting a point light source into a line light source uniformly.

9. The terminal device according to claim 8, wherein the diffusion pattern is a concave-convex structure which is arranged along an arrangement direction of the light source.

10. The light source device according to claim 1, wherein said light-guiding member comprises
an optical waveguide on which said light is incident from the side surface thereof, and
a tilted surface that is tilted to the side of said light source with respect to said light-emitting surface is formed on the surface of the optical waveguide that is on the opposite side from the light-emitting surface that faces said optical member.

11. The light source device according to claim 1, comprising a reflecting sheet disposed on the side opposite from the side on which said optical member is disposed as viewed from said light-guiding member.

12. The light source device according to claim 1, wherein said light source device is built into a display device having a display panel for associating an image with the light by transmitting the light, so that the light emitted from said optical member enters said display panel.

13. A display device comprising:
the light source device according to claim 1; and
a display panel for associating an image with the light by transmitting the light emitted from the light source device.

14. The display device according to claim 13, wherein a pixel arrangement direction of said display panel is tilted with respect to the arrangement direction of said circular cones.

15. The display device according to claim 13, wherein said display panel is a liquid crystal panel.

16. A terminal device comprising the display device according to claim 13.

17. The terminal device according to claim 16, comprising a mobile telephone, a personal information terminal, a gaming device, a digital camera, a video camera, a video player, a notebook-type personal computer, a cash dispenser, or a vending machine.

18. The terminal device according to claim 17 comprising a mobile telephone, wherein said light source is disposed on the top side or bottom side of the display screen.

19. The terminal device according to claim 1, wherein said plurality of circular cones face said light-guiding member.

* * * * *